United States Patent
Tanaka

(10) Patent No.: US 12,388,305 B2
(45) Date of Patent: Aug. 12, 2025

(54) COMPRESSOR WITH STATOR HAVING LARGE DIAMETER AND SMALL DIAMETER PARTS AND WELDING PARTS JOINING HOUSING AND STATOR

(71) Applicant: FUJITSU GENERAL LIMITED, Kanagawa (JP)

(72) Inventor: Hiroaki Tanaka, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 228 days.

(21) Appl. No.: 18/032,091

(22) PCT Filed: Sep. 22, 2021

(86) PCT No.: PCT/JP2021/034830
§ 371 (c)(1),
(2) Date: Apr. 14, 2023

(87) PCT Pub. No.: WO2022/091655
PCT Pub. Date: May 5, 2022

(65) Prior Publication Data
US 2023/0392589 A1    Dec. 7, 2023

(30) Foreign Application Priority Data
Oct. 30, 2020    (JP) ................ 2020-182495

(51) Int. Cl.
*H02K 1/18* (2006.01)
*F04B 35/04* (2006.01)
*H02K 7/14* (2006.01)

(52) U.S. Cl.
CPC ............ *H02K 1/185* (2013.01); *F04B 35/04* (2013.01); *H02K 7/14* (2013.01)

(58) Field of Classification Search
CPC .......... H02K 1/185; H02K 1/18; H02K 1/182; H02K 5/04; H02K 5/24; H02K 7/09;
(Continued)

(56) References Cited

U.S. PATENT DOCUMENTS

| 493,337 A | * | 3/1893 | Parshall | H02K 15/12 |
| | | | | 310/265 |
| 1,703,087 A | * | 2/1929 | Daun | H02K 1/185 |
| | | | | 310/216.118 |

(Continued)

FOREIGN PATENT DOCUMENTS

| JP | 2006-191702 A | 7/2006 |
| JP | 2010-081659 A | 4/2010 |

(Continued)

OTHER PUBLICATIONS

JP 2010081659A English Translation.*
JP 2011019398a English Translation.*
JP 2017034819a English Translation.*

*Primary Examiner* — Maged M Almawri
(74) *Attorney, Agent, or Firm* — Paratus Law Group, PLLC

(57) ABSTRACT

A compressor includes: a compressor; and a motor that is disposed in the compressor housing. The motor has a rotor provided coaxially with respect to a rotary shaft of the compression part, and a stator disposed on an outer peripheral side of the rotor. In the stator, a plurality of large-diameter parts in contact with an inner peripheral surface of the compressor housing and a plurality of small-diameter parts, each of the small-diameter parts having a distance from a rotation center of the motor to an outer peripheral surface, the distance being smaller than the distance of the large-diameter part, are formed in a circumferential direction of the stator. The stator is provided with a plurality of welded parts joining the inner peripheral surface of the compressor (Continued)

housing with the outer peripheral surface of the stator, and the welded parts are provided in the small-diameter part of the stator.

6 Claims, 11 Drawing Sheets

(58) Field of Classification Search
CPC . H02K 11/30; H02K 5/00; H02K 5/06; H02K 5/08; H02K 5/10; H02K 2213/03; F16C 32/047
USPC ........... 310/89, 415, 431–433, 427, 216.127, 310/216.129, 88
See application file for complete search history.

(56) References Cited

U.S. PATENT DOCUMENTS

| | | | | | |
|---|---|---|---|---|---|
| 1,771,475 | A * | 7/1930 | Wright | ............... | H02K 1/185 310/407 |
| 1,795,882 | A * | 3/1931 | Noden | ............... | H02K 1/185 310/216.049 |
| 1,822,096 | A * | 9/1931 | Hollander | ............... | H02K 1/185 310/426 |
| 2,001,799 | A * | 5/1935 | Seyfried | ............... | H02K 1/185 310/414 |
| 2,011,060 | A * | 8/1935 | Leland | ............... | H02K 1/185 310/216.135 |
| 2,023,259 | A * | 12/1935 | Anderson | ............... | H02K 1/185 310/426 |
| 2,251,674 | A * | 8/1941 | Gillen | ............... | H02K 17/10 310/216.049 |
| 2,478,316 | A * | 8/1949 | Potter | ............... | H02K 1/185 310/216.127 |
| 2,523,520 | A * | 9/1950 | Reinhard | ............... | H02K 1/185 310/410 |
| 2,689,394 | A * | 9/1954 | Bentjens | ............... | B23C 5/2295 407/51 |
| 2,711,492 | A * | 6/1955 | Ballman | ............... | H02K 1/185 164/109 |
| 2,876,371 | A * | 3/1959 | Wesolowski | ............... | H02K 1/16 310/216.049 |
| 2,939,021 | A * | 5/1960 | Gilchrist | ............... | H02K 1/185 310/91 |
| 2,977,491 | A * | 3/1961 | Hueffed | ............... | H02K 1/185 310/414 |
| 4,227,109 | A * | 10/1980 | Mulach | ............... | H02K 1/16 310/216.049 |
| 4,286,187 | A * | 8/1981 | Binder | ............... | H02K 7/1815 310/90 |
| 4,603,273 | A * | 7/1986 | McDonald | ............... | H02K 15/16 310/90 |
| 4,642,502 | A * | 2/1987 | Carpenter | ............... | H02K 1/2781 310/216.013 |
| 4,765,054 | A * | 8/1988 | Sauerwein | ............... | H02K 3/522 310/216.115 |
| 4,797,602 | A * | 1/1989 | West | ............... | H02K 1/278 310/156.28 |
| 4,972,113 | A * | 11/1990 | Newberg | ............... | H02K 15/16 310/410 |
| 4,992,686 | A * | 2/1991 | Heine | ............... | H02K 5/225 310/67 R |
| 5,015,904 | A * | 5/1991 | Kleemann | ............... | H02K 3/325 310/194 |
| 5,319,270 | A * | 6/1994 | Tanaka | ............... | H02K 11/21 310/216.096 |
| 5,430,338 | A * | 7/1995 | McMillan | ............... | H02K 5/15 310/91 |
| 5,742,991 | A * | 4/1998 | Kurth | ............... | B29C 45/1747 425/589 |
| 5,767,602 | A * | 6/1998 | Sargeant | ............... | H02K 5/207 310/58 |
| 5,793,136 | A * | 8/1998 | Redzic | ............... | H02K 16/02 310/112 |
| 5,796,190 | A * | 8/1998 | Takeda | ............... | H02K 1/32 310/156.31 |
| 5,818,131 | A * | 10/1998 | Zhang | ............... | F04D 13/0646 310/90.5 |
| 5,821,647 | A * | 10/1998 | Takehara | ............... | H02K 7/14 310/90 |
| 5,850,679 | A * | 12/1998 | Hoffman | ............... | B25B 27/026 29/252 |
| 5,859,486 | A * | 1/1999 | Nakahara | ............... | H02K 1/148 310/216.084 |
| 5,949,169 | A * | 9/1999 | Niimi | ............... | H02K 23/04 310/216.127 |
| 6,040,645 | A * | 3/2000 | Lynch | ............... | H02K 23/54 310/227 |
| 6,124,567 | A * | 9/2000 | Feldhausen | ............... | B23K 9/1006 310/52 |
| 6,225,722 | B1 * | 5/2001 | Rupp | ............... | H02K 21/22 310/91 |
| 6,305,989 | B1 * | 10/2001 | Quadir | ............... | H01R 13/533 439/685 |
| 6,310,320 | B1 * | 10/2001 | Kraus | ............... | B23K 9/1075 219/133 |
| 6,317,963 | B1 * | 11/2001 | Powers | ............... | H02K 15/14 310/58 |
| 6,320,287 | B1 * | 11/2001 | Watson | ............... | H02K 1/185 310/91 |
| 6,346,760 | B1 * | 2/2002 | Boardman, IV | ............... | H02K 1/16 310/216.118 |
| 6,498,417 | B2 * | 12/2002 | Fuller | ............... | H02K 1/185 310/431 |
| 6,589,018 | B2 * | 7/2003 | Chen | ............... | F04D 29/263 310/71 |
| 6,713,930 | B2 * | 3/2004 | Shah | ............... | H02K 1/185 310/216.076 |
| 6,720,699 | B1 * | 4/2004 | Shah | ............... | H02K 1/16 310/182 |
| 6,737,775 | B2 * | 5/2004 | Hatz | ............... | H02K 7/1815 322/4 |
| 6,796,021 | B2 * | 9/2004 | Fuller | ............... | H02K 15/00 310/91 |
| 6,856,064 | B2 * | 2/2005 | Masumoto | ............... | H02K 15/021 310/216.008 |
| 6,866,487 | B2 * | 3/2005 | Abe | ............... | F04C 18/0215 417/410.5 |
| 6,933,640 | B2 * | 8/2005 | Schurter | ............... | H02K 1/185 310/85 |
| 6,960,861 | B2 * | 11/2005 | Yoneda | ............... | H02K 1/148 310/216.012 |
| 6,979,930 | B2 * | 12/2005 | Harada | ............... | H02K 15/021 310/216.004 |
| 7,397,163 | B2 * | 7/2008 | Cook | ............... | H02K 1/187 310/427 |
| 7,471,000 | B1 * | 12/2008 | Ruiz | ............... | H02J 7/1415 320/105 |
| 7,560,838 | B2 * | 7/2009 | van der Woude | ............... | F02C 7/32 310/64 |
| 7,583,001 | B2 * | 9/2009 | Lu | ............... | H02K 1/2791 310/67 R |
| 7,653,986 | B2 * | 2/2010 | Majernik | ............... | H02K 15/028 29/598 |
| 7,687,952 | B2 * | 3/2010 | York | ............... | H02K 1/28 310/263 |
| 7,687,954 | B2 * | 3/2010 | Neet | ............... | H02K 19/24 310/263 |
| 7,719,157 | B2 * | 5/2010 | Yukitake | ............... | F04C 15/008 310/216.049 |
| 7,827,668 | B2 * | 11/2010 | McKee | ............... | E21B 17/20 29/515 |
| 7,847,444 | B2 * | 12/2010 | Kingman | ............... | H02K 5/203 310/91 |
| 7,868,509 | B2 * | 1/2011 | Yoshino | ............... | H02K 1/16 310/216.131 |
| 7,919,898 | B2 * | 4/2011 | Wang | ............... | H02K 1/276 310/216.127 |

(56) References Cited

U.S. PATENT DOCUMENTS

| | | | | |
|---|---|---|---|---|
| 7,928,617 | B2* | 4/2011 | Tsukashima | H02K 7/20 310/51 |
| 7,937,823 | B2* | 5/2011 | Alfermann | H02K 15/022 310/216.008 |
| 8,138,649 | B2* | 3/2012 | Bradfield | H02K 21/044 310/156.19 |
| 8,487,502 | B2* | 7/2013 | Kaiser | H02K 1/16 310/216.049 |
| 8,587,165 | B2* | 11/2013 | Zahora | H02K 9/06 310/58 |
| 8,643,246 | B2* | 2/2014 | Allen | H02K 1/18 310/216.029 |
| 8,829,743 | B2* | 9/2014 | Watanabe | H02K 9/19 310/60 A |
| 8,941,282 | B2* | 1/2015 | Allen | H02K 1/18 310/216.049 |
| 9,136,746 | B2* | 9/2015 | Ikuta | H02K 15/066 |
| 9,263,921 | B2* | 2/2016 | Tanavde | H02K 3/46 |
| 9,287,741 | B2* | 3/2016 | Nobata | H02K 15/14 |
| 9,496,765 | B2* | 11/2016 | Zheng | H02K 1/185 |
| 9,509,182 | B2* | 11/2016 | Yamarthi | H02K 1/185 |
| 10,075,047 | B2* | 9/2018 | Zhou | H02K 1/185 |
| 10,177,631 | B1* | 1/2019 | Hopkins | H02K 5/15 |
| 10,393,082 | B2* | 8/2019 | Ihde | H02J 7/1415 |
| 10,483,817 | B2* | 11/2019 | Sakurai | H02K 1/28 |
| 10,673,289 | B2* | 6/2020 | Nakagawa | H02K 1/148 |
| 10,715,006 | B2* | 7/2020 | Bender | H02K 7/025 |
| 10,840,773 | B2* | 11/2020 | Takano | H02K 9/227 |
| 10,855,134 | B2* | 12/2020 | Ishii | H02K 7/083 |
| 10,907,627 | B2* | 2/2021 | Ihde | F04B 17/03 |
| 11,286,956 | B2* | 3/2022 | Kajikawa | H02K 7/14 |
| 11,658,525 | B2* | 5/2023 | Coppola | H02K 15/028 310/54 |
| 2001/0038797 | A1* | 11/2001 | Makino | H02K 7/14 417/410.3 |
| 2002/0060501 | A1* | 5/2002 | Rafaelof | H02K 5/24 310/67 R |
| 2003/0184182 | A1* | 10/2003 | Smith, Jr. | H02K 15/022 310/216.084 |
| 2003/0214197 | A1* | 11/2003 | De Luca | H02K 1/148 310/216.084 |
| 2004/0217669 | A1* | 11/2004 | Fujii | H02K 1/148 310/216.045 |
| 2004/0256932 | A1* | 12/2004 | Kurosawa | H02K 1/185 310/89 |
| 2005/0034295 | A1* | 2/2005 | Meacham | H02K 1/02 29/598 |
| 2005/0189837 | A1* | 9/2005 | Lee | H02K 3/522 310/215 |
| 2006/0071574 | A1* | 4/2006 | Stewart | H02K 1/146 310/216.132 |
| 2006/0279160 | A1* | 12/2006 | Yoshinaga | H02K 1/148 310/216.049 |
| 2007/0182271 | A1* | 8/2007 | Sugishima | H02K 15/095 310/216.012 |
| 2009/0085415 | A1* | 4/2009 | Lonel | H02K 1/148 310/43 |
| 2009/0212654 | A1* | 8/2009 | Kaneiwa | H02K 3/50 310/214 |
| 2009/0212655 | A1* | 8/2009 | Miyairi | H02K 5/10 310/216.118 |
| 2009/0289522 | A1* | 11/2009 | Buban | H02K 1/148 310/216.113 |
| 2010/0007236 | A1* | 1/2010 | Sano | H02K 1/148 310/216.135 |
| 2010/0021321 | A1* | 1/2010 | Koike | F04C 23/008 310/216.136 |
| 2010/0135830 | A1* | 6/2010 | Yasuda | H02K 1/146 310/216.069 |
| 2010/0148620 | A1* | 6/2010 | Ishizuka | H02K 3/12 310/201 |
| 2010/0270887 | A1* | 10/2010 | Ishizuka | H02K 3/50 310/214 |
| 2010/0308687 | A1* | 12/2010 | George | H02K 1/185 310/216.135 |
| 2011/0121680 | A1* | 5/2011 | Boardman, IV | H02K 1/185 310/216.129 |
| 2012/0001515 | A1* | 1/2012 | Kudose | H02K 1/16 310/216.009 |
| 2012/0139385 | A1* | 6/2012 | Sawada | H02K 1/148 310/216.074 |
| 2012/0153749 | A1* | 6/2012 | Chun | H02K 5/207 310/59 |
| 2012/0169173 | A1* | 7/2012 | Jang | H02K 3/345 310/215 |
| 2012/0206009 | A1* | 8/2012 | Jang | H02K 3/522 310/179 |
| 2013/0089428 | A1* | 4/2013 | Hottier | F01D 5/00 416/223 R |
| 2013/0106252 | A1* | 5/2013 | Yanagida | H02K 11/225 310/68 B |
| 2013/0140939 | A1* | 6/2013 | Asaga | H02K 15/02 29/598 |
| 2013/0187517 | A1* | 7/2013 | Asao | H02K 5/04 310/68 D |
| 2013/0207509 | A1* | 8/2013 | Shimaguchi | H02K 1/185 310/216.113 |
| 2013/0313922 | A1* | 11/2013 | Kim | H02K 3/522 310/44 |
| 2014/0167558 | A1* | 6/2014 | Woo | H02K 5/24 310/216.113 |
| 2014/0197705 | A1* | 7/2014 | Sato | H02K 1/185 310/91 |
| 2014/0197715 | A1* | 7/2014 | Roopnarine | H02K 9/02 310/216.106 |
| 2014/0210284 | A1* | 7/2014 | Banba | H02K 15/021 310/43 |
| 2014/0231483 | A1* | 8/2014 | Takaichi | B26F 3/00 225/105 |
| 2014/0265683 | A1* | 9/2014 | Hossain | H02K 1/185 310/89 |
| 2014/0333163 | A1* | 11/2014 | Horii | H02K 9/10 310/59 |
| 2014/0354107 | A1* | 12/2014 | Alfermann | H02K 15/14 310/216.113 |
| 2014/0360334 | A1* | 12/2014 | Singer-Schnoeller | B23B 31/11 29/428 |
| 2015/0000114 | A1* | 1/2015 | Matsushita | H02K 15/03 29/729 |
| 2015/0022051 | A1* | 1/2015 | Meng | B29C 45/0001 524/514 |
| 2015/0069865 | A1* | 3/2015 | Alfermann | H02K 9/19 310/54 |
| 2015/0076940 | A1* | 3/2015 | Ohashi | H02K 5/04 310/58 |
| 2015/0143691 | A1* | 5/2015 | Takaichi | H02K 15/03 29/738 |
| 2015/0222151 | A1* | 8/2015 | Semken | H02K 1/28 29/452 |
| 2015/0364966 | A1* | 12/2015 | Maihara | H02K 5/24 310/51 |
| 2016/0079817 | A1* | 3/2016 | Hayashi | H02K 1/22 29/598 |
| 2016/0087493 | A1* | 3/2016 | Kanakamedala | H02K 1/18 310/216.129 |
| 2016/0285324 | A1* | 9/2016 | Carrasco | H02K 1/185 |
| 2016/0285342 | A1* | 9/2016 | Carrasco | H02K 7/09 |
| 2017/0182587 | A1* | 6/2017 | Tokoro | B23K 20/123 |
| 2017/0201135 | A1* | 7/2017 | Kai | H02K 3/18 |
| 2017/0284396 | A1* | 10/2017 | Fukasaku | F04C 21/00 |
| 2017/0313283 | A1* | 11/2017 | Kojima | H02K 1/146 |
| 2018/0043420 | A1* | 2/2018 | Handwerker | B21K 25/005 |
| 2018/0138762 | A1* | 5/2018 | Jeong | H02K 5/203 |
| 2018/0248439 | A1* | 8/2018 | McGrew, Jr. | H02K 1/185 |
| 2018/0351435 | A1* | 12/2018 | Takano | H02K 9/223 |

(56) References Cited

U.S. PATENT DOCUMENTS

| | | | |
|---|---|---|---|
| 2019/0173334 A1* | 6/2019 | Takahashi | H02K 19/22 |
| 2020/0144882 A1* | 5/2020 | Tang | H02K 1/185 |
| 2022/0094233 A1* | 3/2022 | Seo | H02K 5/225 |

FOREIGN PATENT DOCUMENTS

| | | |
|---|---|---|
| JP | 2011-019398 A | 1/2011 |
| JP | 2011-050151 A | 3/2011 |
| JP | 2011-055576 A | 3/2011 |
| JP | 2012-161126 A | 8/2012 |
| JP | 2017-034819 A | 2/2017 |

* cited by examiner

COMPRESSOR WITH STATOR HAVING LARGE DIAMETER AND SMALL DIAMETER PARTS AND WELDING PARTS JOINING HOUSING AND STATOR

CROSS REFERENCE TO PRIOR APPLICATION

This application is a National Stage Patent Application of PCT International Patent Application No. PCT/JP2021/034830 (filed on Sep. 22, 2021) under 35 U.S.C. § 371, which claims priority to Japanese Patent Application No. 2020-182495 (filed on Oct. 30, 2020), which are all hereby incorporated by reference in their entirety.

FIELD

The present invention relates to a compressor.

BACKGROUND

For example, a rotary compressor is provided with a motor that is disposed in a compressor housing, and an outer peripheral surface of a stator of the motor is welded with and fixed to an inner peripheral surface of the compressor housing. In manufacturing processes of a rotary compressor of this type, it is known that a stator is temporarily joined with a compressor housing by shrink-fitting (A method of joining two parts by utilizing thermal expansion and contraction. [1] The inner diameter of a hole is enlarged by heating and expanding the part positioned in the outer side and provided with the hole. [2] The part positioned in the inner side is fitted into the hole of the part in the outer side with the enlarged diameter. [3] When the part in the outer side is cooled, the inner diameter of the hole is narrowed, and the two parts are mutually fixed since the part in the outer side tightens the part in the inner side.) the compressor housing onto the stator, and the compressor housing on which the stator is fitted is then conveyed to a welding process to carry out welding.

CITATION LIST

Patent Literature

Patent Literature 1: JP 2006-191702 A
Patent Literature 2: JP 2011-55576 A

SUMMARY

Technical Problem

In the motor that is disposed in the compressor housing, when distortion occurs in the stator, the magnetic characteristics of the stator are deteriorated, iron loss increases, and motor efficiency is decreased. Therefore, when temporary joining of the stator is to be carried out by shrink-fitting of the compressor housing, generally, the inner diameter of the compressor housing is formed with respect to the outer diameter of the stator so as to implement transition-fitting (a state in which the outer diameter of the stator can be larger or smaller than the inner diameter of the compressor housing because of variations within the range of tolerance), which is between interference-fitting of fitting tolerance (a state in which the outer diameter of the stator is always larger than the inner diameter of the compressor housing within the range of tolerance) and clearance-fitting (a state in which the outer diameter of the stator is always smaller than the inner diameter of the compressor housing within the range of tolerance). By virtue of this, the generation of distortion in the stator caused by the external force applied from the shrink-fitted compressor housing, is suppressed. Then, after the stator is temporarily joined with the compressor housing by shrink-fitting, the stator is fixed to the compressor housing by welding. In other words, the stator is firmly fixed to the compressor housing while distortion of the stator is decreased, by fixing the stator in the compressor housing by welding, while the temporarily joined state of the stator disposed in the compressor housing is maintained by the transition-fitting.

However, even in the case in which the inner diameter of the compressor housing is formed to implement the transition-fitting, if dimensional variations result in the vicinity of a lower limit of dimension tolerance, the interference (the difference between the outer diameter of the stator and the inner diameter of the compressor housing in the case in which the outer diameter of the stator is larger than the inner diameter of the compressor housing) may become large as well as the interference-fitting. If the interference becomes large, motor efficiency is lowered due to the distortion generated in the stator tightened by the compressor housing, and there is no longer the advantage of fixing the stator onto the compressor housing by welding.

The disclosed techniques have been accomplished in view of the foregoing, and it is an object to provide a compressor which can decrease the distortion generated in a stator when the stator is fixed to a compressor housing.

Solution to Problem

According to an aspect of an embodiments in the present application, a compressor includes: a compressor housing; a compression part that is disposed in the compressor housing and compresses a cooling medium; and a motor that is disposed in the compressor housing and drives the compression part, wherein the motor has a rotor provided coaxially with respect to a rotary shaft of the compression part, and a stator disposed on an outer peripheral side of the rotor, in the stator, a plurality of large-diameter parts in contact with an inner peripheral surface of the compressor housing and a plurality of small-diameter parts, each of the small-diameter parts having a distance from a rotation center of the motor to an outer peripheral surface, the distance being smaller than the distance of the large-diameter part, are formed in a circumferential direction of the stator, and the stator is provided with a plurality of welded parts joining the inner peripheral surface of the compressor housing with the outer peripheral surface of the stator, and the welded parts are provided in the small-diameter parts of the stator.

Advantageous Effects of Invention

According to a mode of a compressor disclosed in the present application, the distortion generated in a stator when the stator is fixed to a compressor housing can be decreased, and decrease in motor efficiency can be suppressed.

DESCRIPTION OF EMBODIMENTS

Hereinafter, an embodiment of a compressor disclosed in the present application will be described in detail based on drawings. Note that the compressor disclosed in the present application is not limited by the following embodiment.

Embodiment

Figure 1:
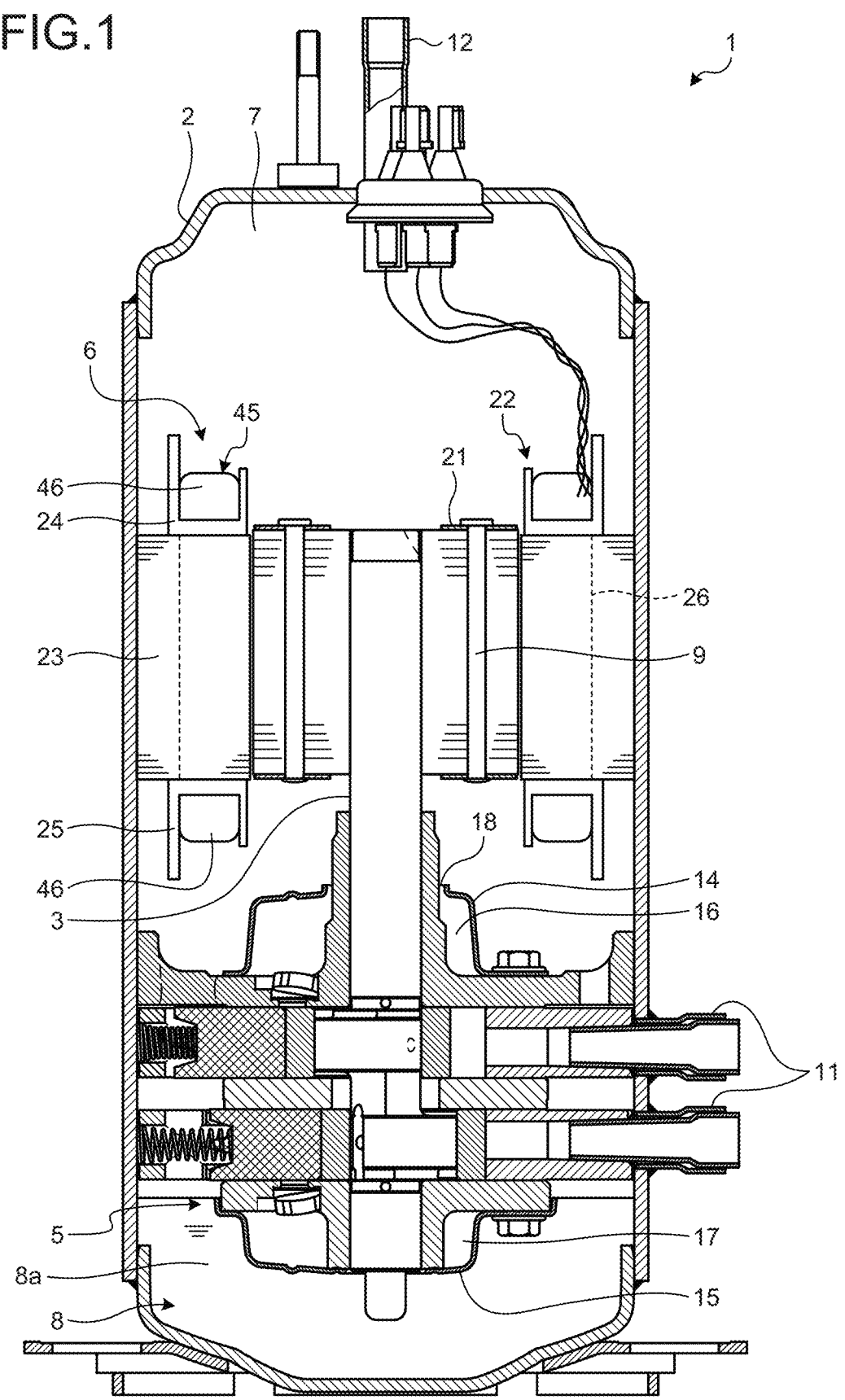
FIG. 1 is a vertical cross-sectional view illustrating a compressor of an embodiment.

FIG. 1 is a vertical cross-sectional view illustrating a compressor of an embodiment. As illustrated in FIG. 1, a compressor 1 is a so-called rotary compressor and is provided with a container 2 serving as a compressor housing, a shaft 3 serving as a rotary shaft, a compression part 5, and a three-phase motor 6. The container 2 is formed of a metallic material and forms a sealed internal space 7. The internal space 7 is formed in an approximately columnar shape. The container 2 is formed so that, when the container is vertically placed on a horizontal plane, the central axis of the column forming the internal space 7, is parallel to the perpendicular direction. In the container 2, an oil reservoir 8 is formed in a lower part of the internal space 7. In the oil reservoir 8, refrigerant oil 8a, which is lubricating oil which lubricates the compression part 5, is stored. Intake tubes 11 serving as intake parts, which take in a cooling medium, and a discharge tube 12 serving as a discharge part, which discharges the compressed cooling medium, are connected to the container 2. The shaft 3 serving as the rotary shaft is formed in a rod shape and is disposed in the internal space 7 of the container 2 so that one end thereof is disposed in the oil reservoir 8. The shaft 3 is supported, by the container 2, rotatably about the central axis of the column which forms the internal space 7. The shaft 3 supplies the refrigerant oil 8a, which is stored in the oil reservoir 8, to the compression part 5 by rotating.

The compression part 5 is disposed in the lower part of the internal space 7 and is disposed above the oil reservoir 8. The compressor 1 is further provided with an upper muffler cover 14 and a lower muffler cover 15. The upper muffler cover 14 is disposed in an upper part of the compression part 5 in the internal space 7. The upper muffler cover 14 forms an upper muffler chamber 16 therein. The lower muffler cover 15 is provided in a lower part of the compression part 5 in the internal space 7 and is disposed above the oil reservoir 8. The lower muffler cover 15 forms a lower muffler chamber 17 therein. The lower muffler chamber 17 is communicated with the upper muffler chamber 16 via a communication path (not illustrated) formed in the compression part 5. A compressed cooling-medium discharge hole 18 is formed between the upper muffler cover 14 and the shaft 3, and the upper muffler chamber 16 is communicated with the internal space 7 via the compressed cooling-medium discharge hole 18.

When the shaft 3 rotates, the compression part 5 compresses the cooling medium, which is supplied from the intake tubes 11, and supplies the compressed cooling medium to the upper muffler chamber 16 and the lower muffler chamber 17. The cooling medium has compatibility with the refrigerant oil 8a. The three-phase motor 6 is disposed above the compression part 5 in the internal space 7.

Figure 2:
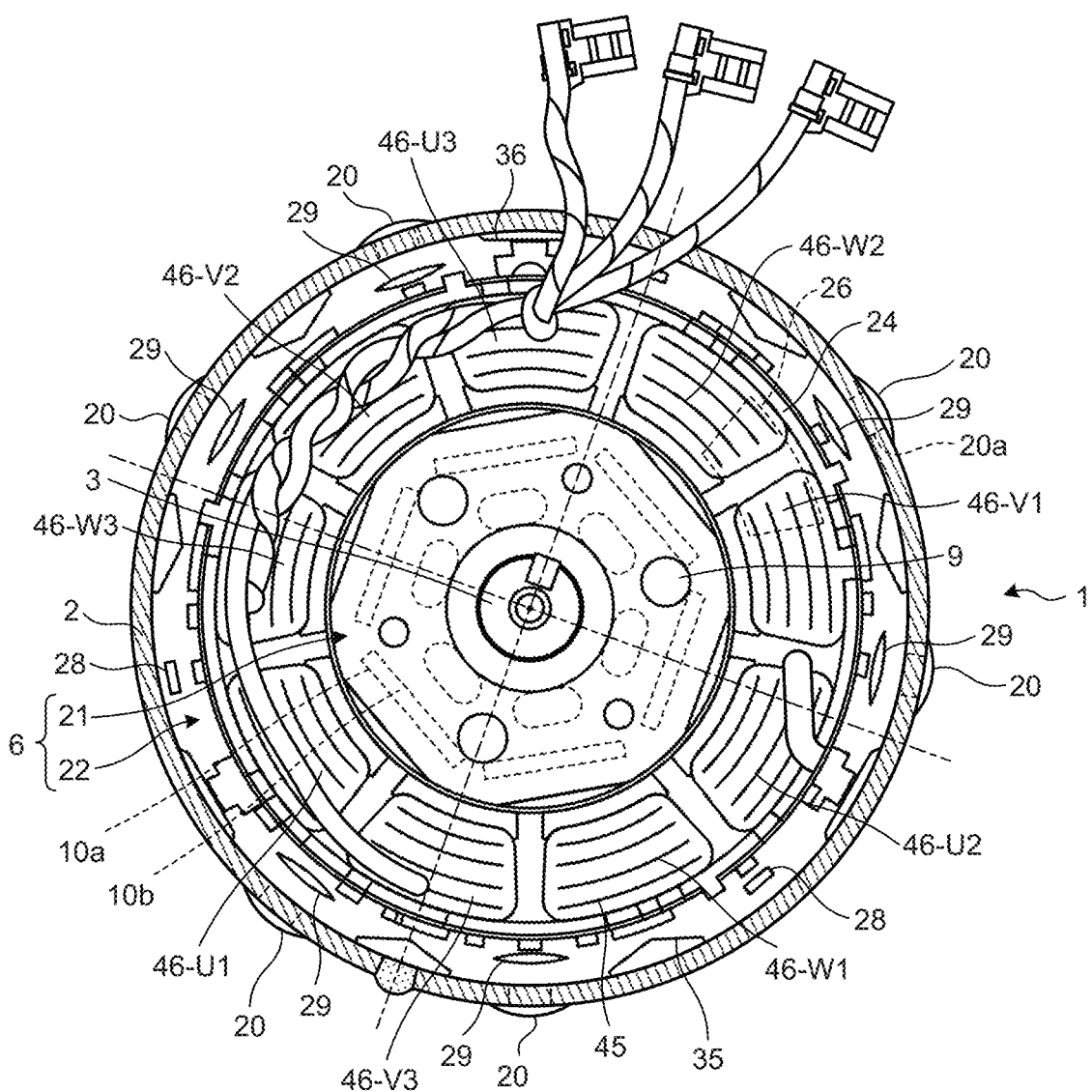
FIG. 2 is a transverse cross-sectional view illustrating a three-phase motor of the compressor of the embodiment.

FIG. 2 is a transverse cross-sectional view illustrating the three-phase motor 6 of the compressor 1 of the embodiment. As illustrated in FIG. 1 and FIG. 2, the three-phase motor 6 is provided with a rotor 21 and a stator 22. The rotor 21 is formed in a columnar shape by stacking a plurality of metal plates and is integrated by later-described swaged parts 28 and a plurality of rivets 9. The shaft 3 is inserted in the center of the rotor 21, and the rotor 21 is fixed with respect to the shaft 3. In the rotor 21, six slit-shaped magnet embedding holes 10a are formed so as to form sides of a hexagon about the shaft 3. The magnet embedding holes 10a are formed at a predetermined interval in a circumferential direction of the rotor 21. In the magnet embedding holes 10a, plate-shaped permanent magnets 10b are embedded.

The stator 22 is formed in an approximately cylindrical shape and is disposed so as to surround an outer peripheral side of the rotor 21. The stator 22 is provided with an annular stator core 23, an upper insulator 24, a lower insulator 25, and a plurality of winding wires 46 (see FIG. 1). The stator 22 and the container 2 are welded by a plurality of welded parts 20 that are formed in the circumferential direction of the stator 22. In other words, the outer peripheral surface of the stator core 23 is spot-welded by the welded parts 20 with respect to an inner peripheral surface of the container 2. The welded parts 20 are provided at intervals in the circumferential direction of the stator 22 (about the axis of the shaft 3). Also, a plurality of welded parts 20 is provided also in the axial direction of the stator 22 (axial direction of the shaft 3).

The upper insulator 24 is fixed to an upper end of the stator core 23. The lower insulator 25 is fixed to a lower end of the stator core 23. Also, as illustrated in FIG. 1 and FIG. 2, in the stator core 23, an insulative film 26 is inserted along the inner peripheral surfaces of slots between later-described stator-core teeth parts 32-1 to 32-9, and the stator core 23 and the winding wires 46 are insulated from each other by the insulative film 26. The insulative film 26 is formed of a resin material such as polyethylene terephthalate (PET) or polyethylene naphthalate (PEN). Also, the upper insulator 24 and the lower insulator 25 are formed of resin materials, and are insulative members which insulate the stator core 23 and the winding wires 46 from each other.

Structure of Stator

Figure 3:
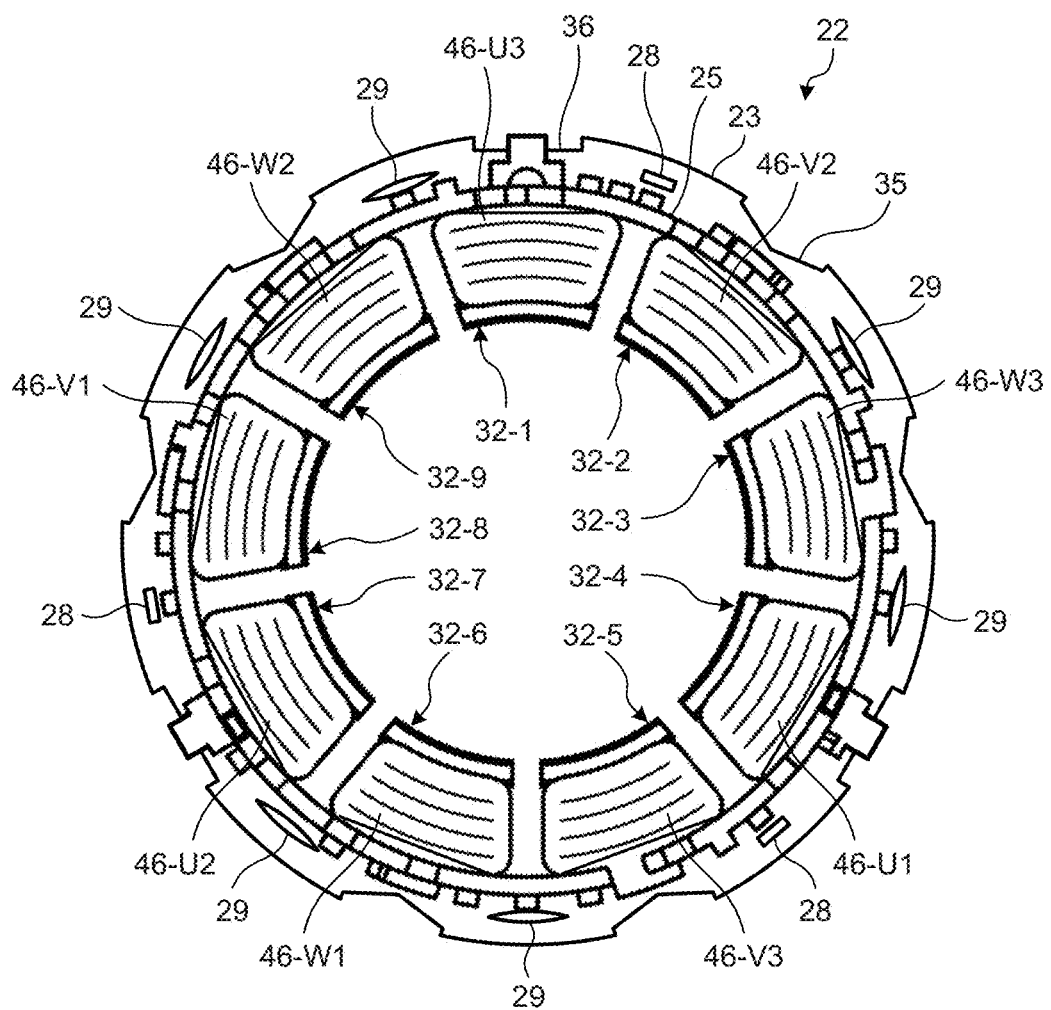
FIG. 3 is a plan view illustrating a stator of the three-phase motor in the embodiment.

FIG. 3 is a plan view illustrating the stator 22 of the three-phase motor 6 in the embodiment. As illustrated in FIG. 3, the winding wires 46, which are electric wires, are wound around each of the later-described plurality of stator-core teeth parts 32-1 to 32-9 in the stator core 23. In each of the stator-core teeth parts 32-1 to 32-9, a wound part 45 is formed by each winding wire 46. The three-phase motor 6 in the embodiment is a motor of a concentrated winding type with six poles and nine slots (see FIG. 2). The plurality of winding wires 46 is provided with a plurality of U-phase winding wires 46-U1 to 46-U3, a plurality of V-phase winding wires 46-VI to 46-V3, and a plurality of W-phase winding wires 46-W1 to 46-W3. Also, in the stator 22, neutral wires, which are extended from the wound parts 45 and gathered in a bundle, are covered with insulative tubes and inserted in the gaps between the wound parts 45, which are mutually adjacent in the circumferential direction of the stator 22 (rotation direction of the rotor 21) (see FIG. 2).

Figure 4:
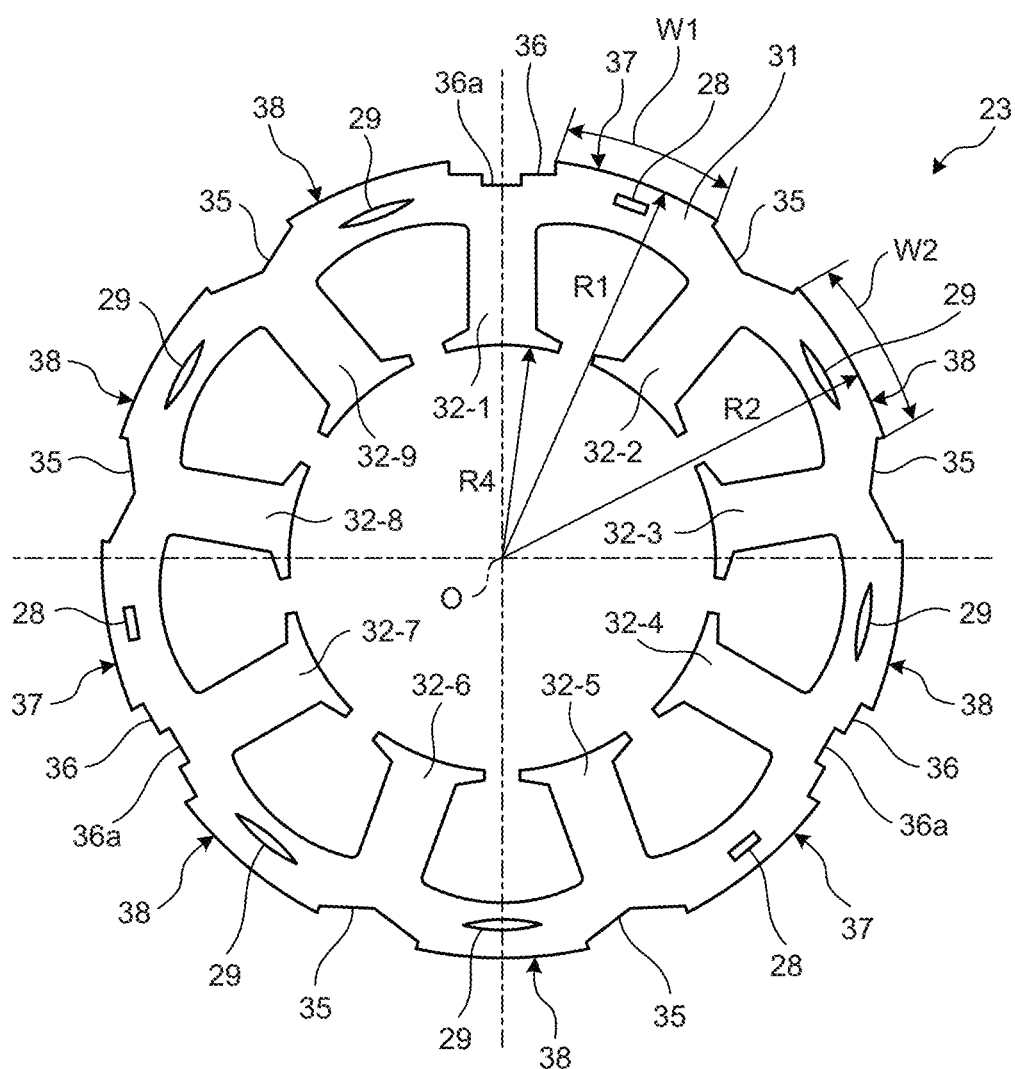
FIG. 4 is a plan view illustrating a stator core in the embodiment.

FIG. 4 is a plan view illustrating the stator core 23 in the embodiment. As illustrated in FIG. 4, the stator core 23 is provided with an annular yoke part 31, and the plurality of stator-core teeth parts 32-1 to 32-9 as drum parts, and is formed by stacking a plurality of metal plates. The metal plates are formed of, for example, soft magnetic bodies such as silicon steel plates.

The yoke part 31 is formed approximately in a cylindrical shape. The first stator-core teeth part 32-1 among the plurality of stator-core teeth parts 32-1 to 32-9, is formed approximately in a pillar shape. The first stator-core teeth part 32-1 is formed so that one end thereof is continuously formed in the inner peripheral side of the yoke part 31, in other words, the first stator-core teeth part 32-1 is formed so as to project from the inner peripheral surface of the yoke part 31 toward the central axis of the stator core 23. Similar to the first stator-core teeth part 32-1, the stator-core teeth parts 32-2 to 32-9 other than the first stator-core teeth part 32-1 among the plurality of stator-core teeth parts 32-1 to 32-9, are also formed in approximately pillar shapes and are projecting toward the central axis of the stator core 23 from the inner peripheral surface of the yoke part 31. Also, the plurality of stator-core teeth parts 32-1 to 32-9 are formed on the inner peripheral surface of the yoke part 31 to be disposed at an equal interval of 40 degrees in the circumferential direction of the yoke part 31. Hereinafter, the plurality of stator-core teeth parts 32-1 to 32-9 of the stator core 23 will be referred to as the stator-core teeth parts 32.

Also, as illustrated in FIG. 4, on the outer peripheral surface of the stator core 23, siz first recessed parts 35 and three second recessed parts 36, through which the refrigerant oil 8a and the cooling medium pass, are provided, across the axial direction of the stator core 23, at the positions corresponding to the stator-core teeth parts 32 in the circumferential direction of the stator core 23. Two of the first recessed parts 35 are disposed to be interposed between the mutually adjacent second recessed parts 36 in the circumferential direction of the stator core 23. Also, a cutout groove 36a for locating and attaching the upper insulator 24 and the lower insulator 25 with respect to the stator core 23, is formed on each of the three second recessed parts 36. A main part of the stator core 23 will be described later.

Characteristic Configurations of Compressor

Next, characteristic configurations of the compressor 1 of the embodiment will be described. The characteristics of the embodiment include the stator core 23 in the three-phase motor 6. In a manufacturing process of the compressor 1 of the present embodiment, the stator 22 is temporarily joined with the container 2 by shrink-fitting the container 2 onto the stator 22. The stator 22 is temporarily joined in the container 2 and is then fixed by spot-welding onto the container 2. The stator core 23 of the stator 22 in the embodiment is formed to have the dimensions that the outer diameter thereof implements transition-fitting with respect to the inner diameter of the container 2, and the stator core 23 has the parts with different outer diameters in order to decrease the part which receives external force from the container 2 and to mitigate the external force applied from the container 2 when the container 2 is shrink-fitted onto the stator core 23. As a result, the stator core 23 decreases the compression distortion, which is generated along with the external force applied from the container 2.

Figure 5:
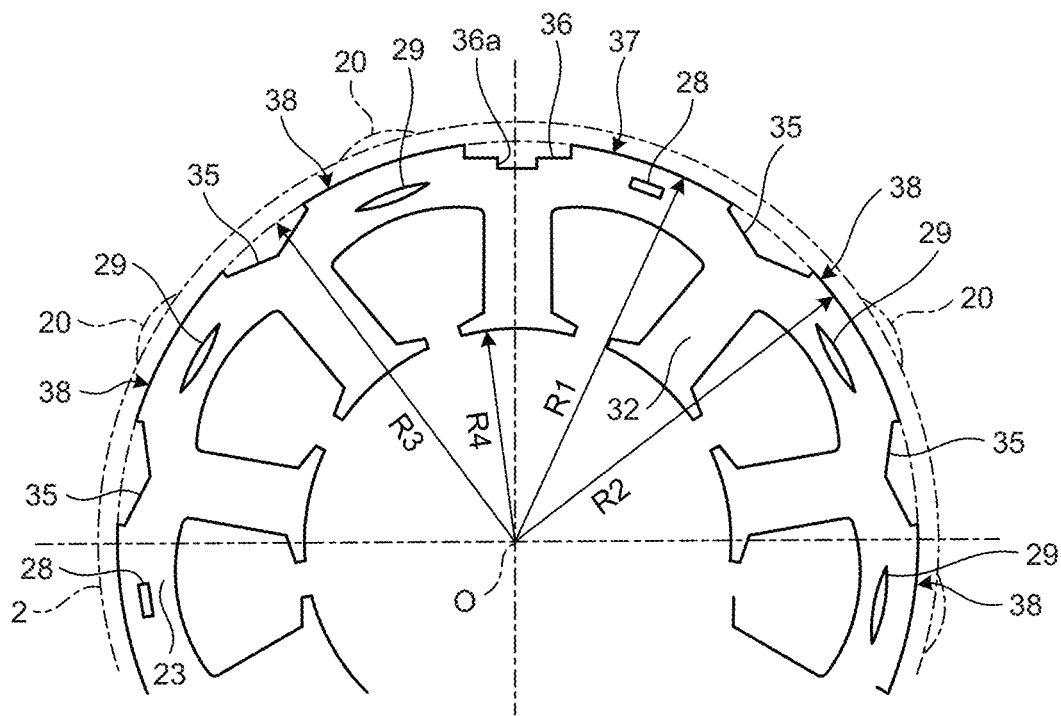
FIG. 5 is a plan view illustrating a main part of the stator core in the embodiment.
Figure 6:
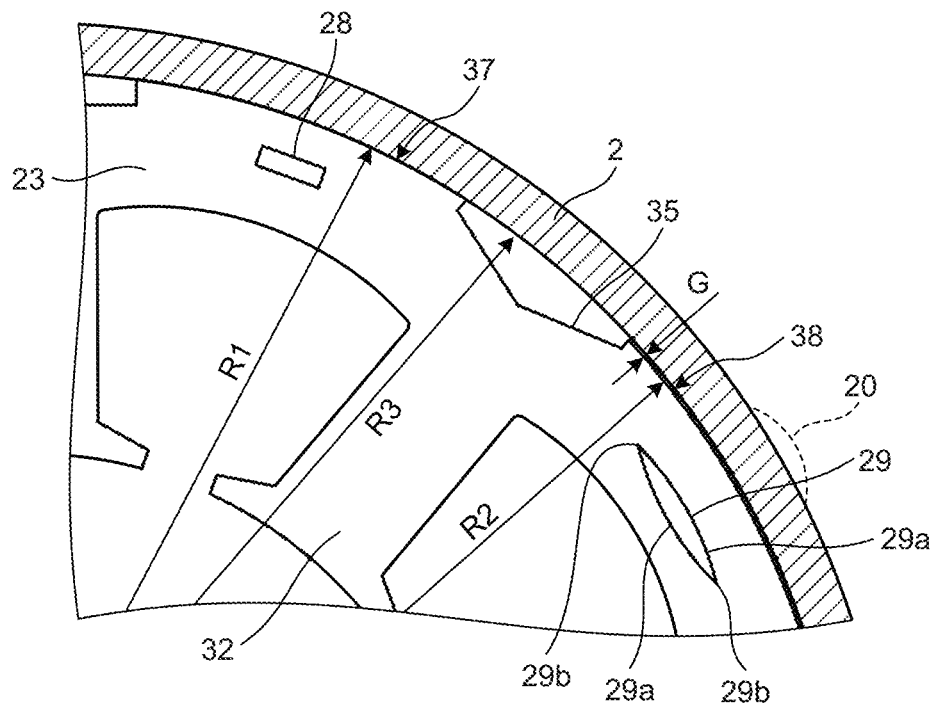
FIG. 6 is a plan view enlarging and illustrating a small-diameter part of the stator core in the embodiment.

FIG. 5 is a plan view illustrating the main part of the stator core 23 in the embodiment. FIG. 6 is a plan view enlarging and illustrating a small-diameter part of the stator core 23 in the embodiment. As illustrated in FIG. 4, FIG. 5, and FIG. 6, in the stator core 23 of the stator 22, in the circumferential direction of the stator core 23, a plurality of large-diameter parts 37, which are fitted on the inner peripheral surface of the container 2 by transition-fitting, and a plurality of small-diameter parts 38, which are clearance-fitted on the inner peripheral surface of the container 2, are formed to interpose therebetween the first recessed part 35 or the second recessed part 36 through which the refrigerant oil 8a passes. In other words, in the circumferential direction of the stator core 23, the large-diameter parts 37 and the small-diameter parts 38 are disposed at predetermined intervals therebetween. The large-diameter parts 37 and the small-diameter parts 38 mean parts of the outer peripheral surface of the annular yoke part 31 of the stator core 23.

Therefore, a relation of R1>R2 is satisfied, wherein the distance from a center O of the stator core 23 serving as a rotation center of the three-phase motor 6 to the outer peripheral surface of the large-diameter part 37 (large-diameter-part outer diameter) is R1, and the distance from the center O to the outer peripheral surface of the small-diameter part 38 (small-diameter-part outer diameter) is R2. Also, a relation of R3>R2 is satisfied, wherein the distance from the center O to the inner peripheral surface of the container 2 (housing inner diameter) is R3. Also, each of the small-diameter parts 38 clearance-fitted on the inner peripheral surface of the container 2 is formed so that a gap G (=R3−R2) (see FIG. 6) between the outer peripheral surface of the small-diameter part 38 and the inner peripheral surface of the container 2, is larger than 0 and equal to or lower than 250 [μm]. The gap G is set to, for example, 50 [μm]≤G≤250 [μm].

In other words, a contact part by which the stator core 23 contacts the inner peripheral surface of the container 2 when the container 2 is shrink-fitted onto the stator core 23, is the large-diameter part 37, and a non-contact part by which the stator core 23 does not contact the inner peripheral surface of the container 2 by clearance-fitting, is the small-diameter part 38. The stator core 23, which is fitted by shrink-fitting the large-diameter parts 37 in the container 2, is spot-welded with the container 2 only by the small-diameter part 38. Therefore, in the container 2, the plurality of welded parts 20, at which the inner peripheral surface of the container 2 and the outer peripheral surface of the stator core 23 are joined, is provided, and the welded parts 20 are provided only in the small-diameter parts 38. Note that the large-diameter parts 37 are the contact parts for temporarily joining the stator core 23 in the container 2, and at least two of the large-diameter parts 37 may be provided on the stator core 23 in order to implement the temporary joining.

The stator core 23 in the present embodiment has the three large-diameter parts 37 and the six small-diameter parts 38. The three large-diameter parts 37 are disposed at an equal interval in the circumferential direction of the stator core 23. The six small-diameter parts 38 are disposed so that two of the small-diameter parts 38 are disposed on each side to interpose each large-diameter part 37 in the circumferential direction of the stator core 23. Note that the numbers of the large-diameter parts 37 and the small-diameter parts 38 are not limited to the above described numbers. Depending on the number of slots of the three-phase motor 6, for example, the number of the small-diameter parts 38 is only needed to be two times or more of the number of the large-diameter parts 37.

In the circumferential direction of the stator core 23, a circumferential-direction length W1 of the large-diameter part 37 along the outer peripheral surface of the stator core 23 and a circumferential-direction length W2 of the small-diameter part 38, are formed to be equivalent to each other. Each large-diameter part 37 and each small-diameter part 38 are set to have a central angle of about 20 degrees about the center O of the stator core 23 (see FIG. 4).

In the circumferential direction of the stator core 23, a small-diameter range, which is a sum of the circumferential-direction lengths W2 of the plurality of small-diameter parts 38 along the outer peripheral surface of the stator core 23, is larger than a large-diameter range, which is a sum of the circumferential-direction length W1 of the plurality of large-diameter parts 37. In other words, 6W2, which is the sum of the circumferential-direction lengths W2 of the six small-diameter parts 38, is larger than 3W1, which is the sum of the circumferential-direction lengths W1 of the three large-diameter parts 37. As a result, in the circumferential direction of the stator core 23, the large-diameter range, by which the outer peripheral surface of the stator core 23 contacts the inner peripheral surface of the container 2, is decreased, and the external force, applied from the container 2 to the stator core 23 upon shrink-fitting, can be appropriately decreased.

As illustrated in FIG. 4 and FIG. 5, the swaged part 28, which integrates and fixes the plurality of stacked metal plates, is provided at each of the plurality of large-diameter parts 37. The swaged parts 28 mutually join the metal plates by swaging so that part of the metal plates project in the thickness direction of the metal plates. The small-diameter parts 38 are not provided with the swaged parts 28.

Figure 7:
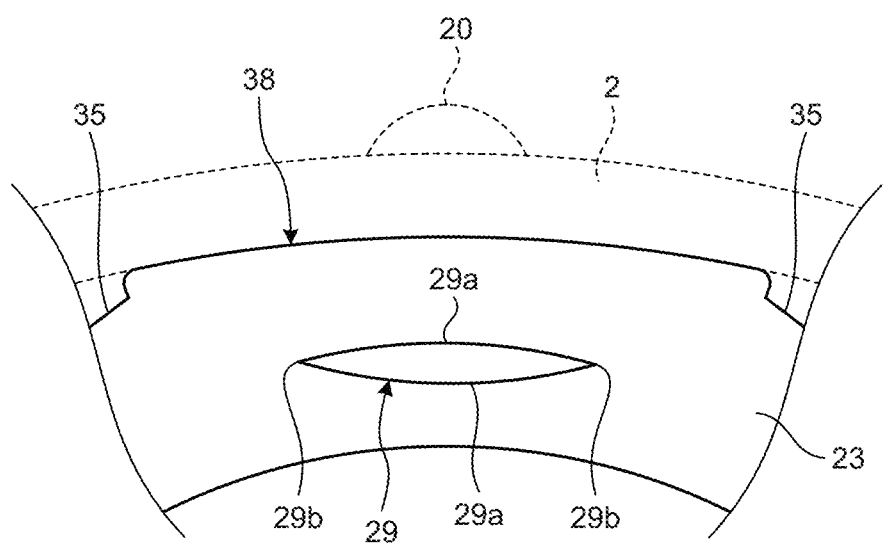
FIG. 7 is a plan view enlarging and illustrating a through-hole of the stator core in the embodiment.

FIG. 7 is a plan view enlarging and illustrating a through-hole of the stator core 23 in the embodiment. As illustrated in FIG. 5 and FIG. 7, each of the plurality of small-diameter parts 38 is provided with a through-hole 29, which penetrates through the stator core 23 in the axial direction of the shaft 3. The through-hole 29 is formed as a narrow long-hole-shaped opening, which extends in the circumferential direction of the stator core 23. The through-hole 29 has arc-shaped long sides 29a, which extend in the circumferential direction of the stator core 23, and apexes 29b, which are formed at both ends of the long sides 29a in the circumferential direction of the stator core 23.

The through-hole 29 act as heat insulating space, which shields the heat applied to the stator core 23 upon welding of the small-diameter part 38 and the container 2. Also, since part of the heat, which has reached the through-hole 29 from the welded part 20, is caused to escape in the circumferential direction so as to be along the arc-shaped long side 29a, the heat from the welded part 20, does not easily travel around the through-hole 29. Therefore, melting of the insulative film 26 (FIGS. 1 and 2), which is formed between the stator-core teeth parts 32, due to the heat of welding, is suppressed. Note that from the viewpoint of shielding the heat which transmits from the welded part 20 to the stator core 23, the position of the through-hole 29 with respect to the radial direction of the stator core 23, is preferred to be disposed near the outer peripheral side of the small-diameter part 38. Also, since each of the through-holes 29 is formed so that the center side thereof in the circumferential direction of the stator core 23 (vicinity of the midpoint of the long side 29a) is the thickest, the heat from the part close to the welded part 20, is not easily transmitted to the inner diameter side. In addition, since the through-hole 29 is provided with the arc-shaped long side 29a, the flow of the magnetic flux, which pass through the stator core 23, is not easily disturbed.

Figure 8:
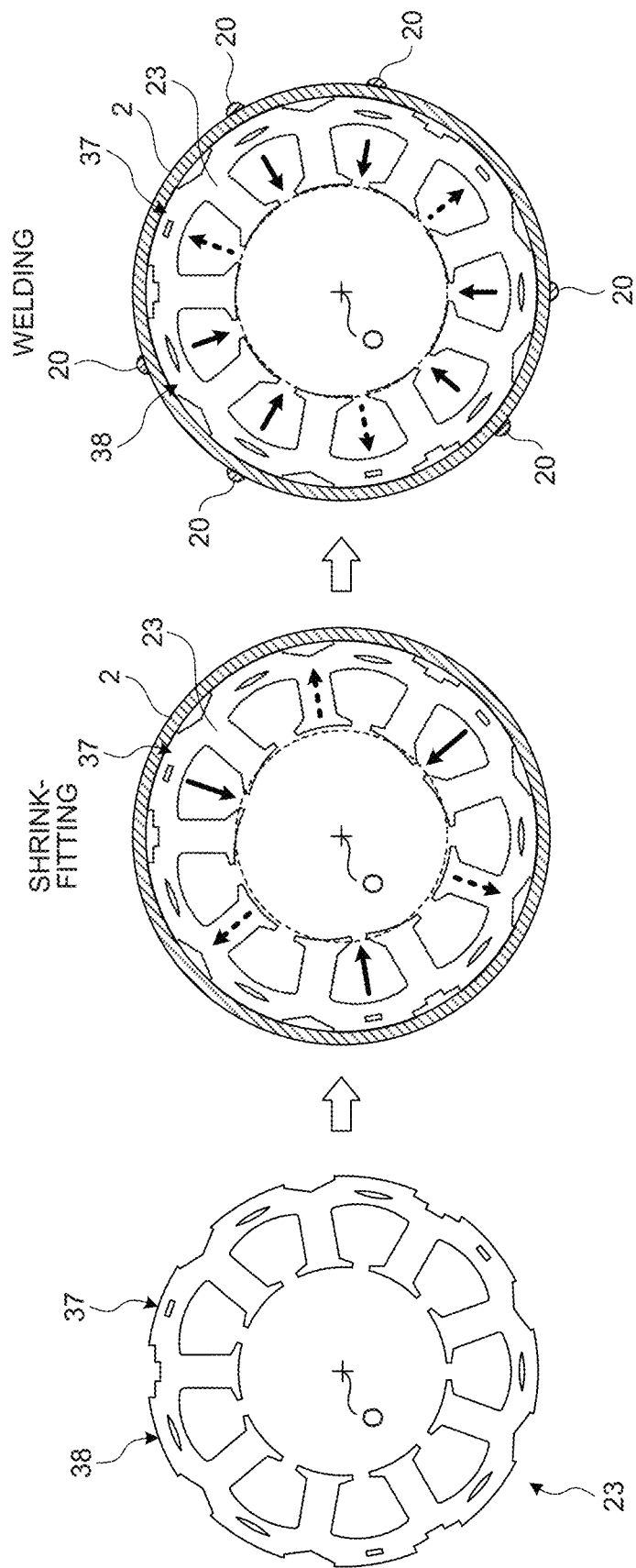
FIG. 8 is a plan view for describing the external force and the stress which act on the stator core in manufacturing processes of the compressor of the embodiment.
Figure 9:
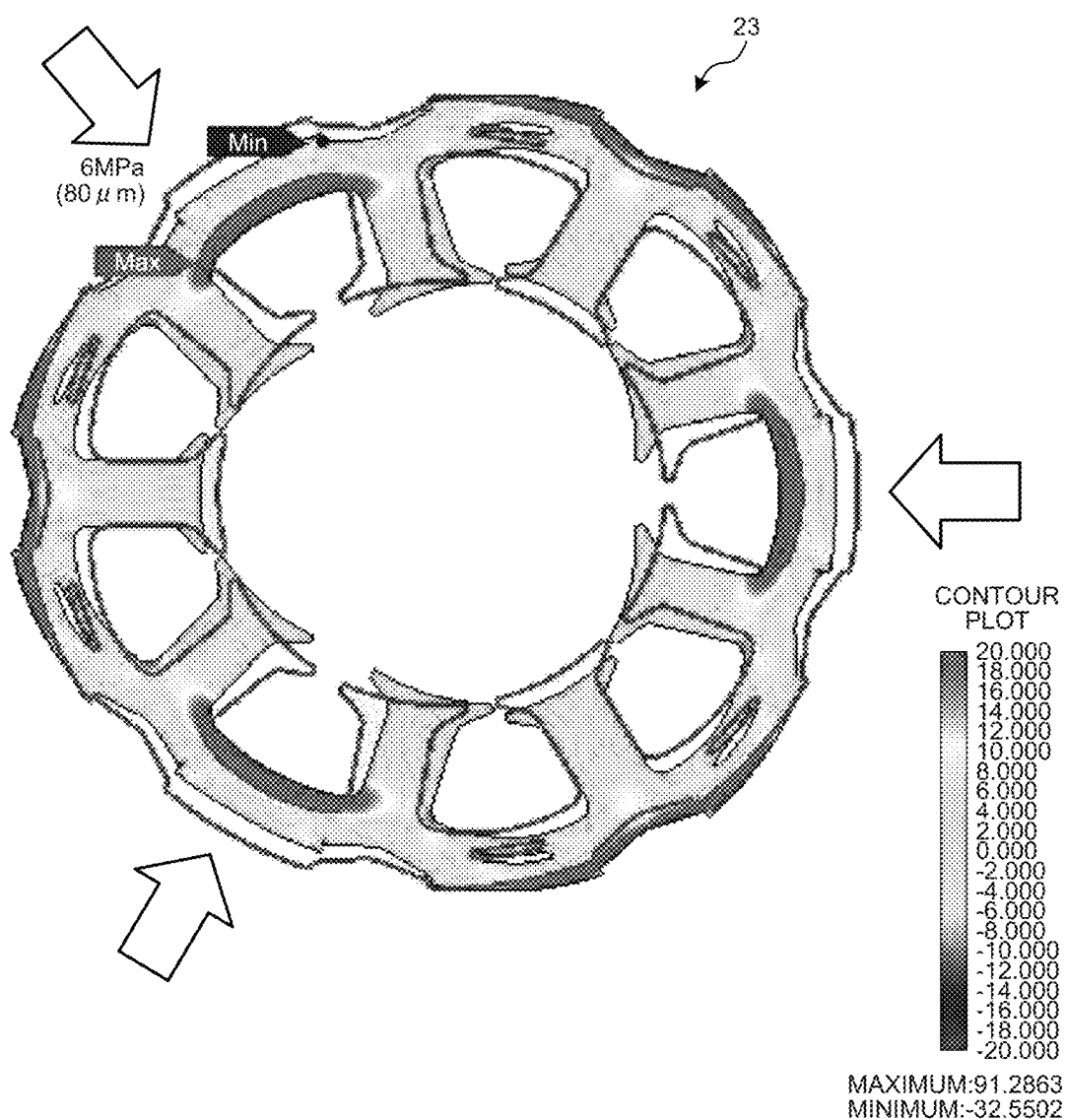
FIG. 9 is a diagram illustrating deformation generated in the stator core in the embodiment.
Figure 10:
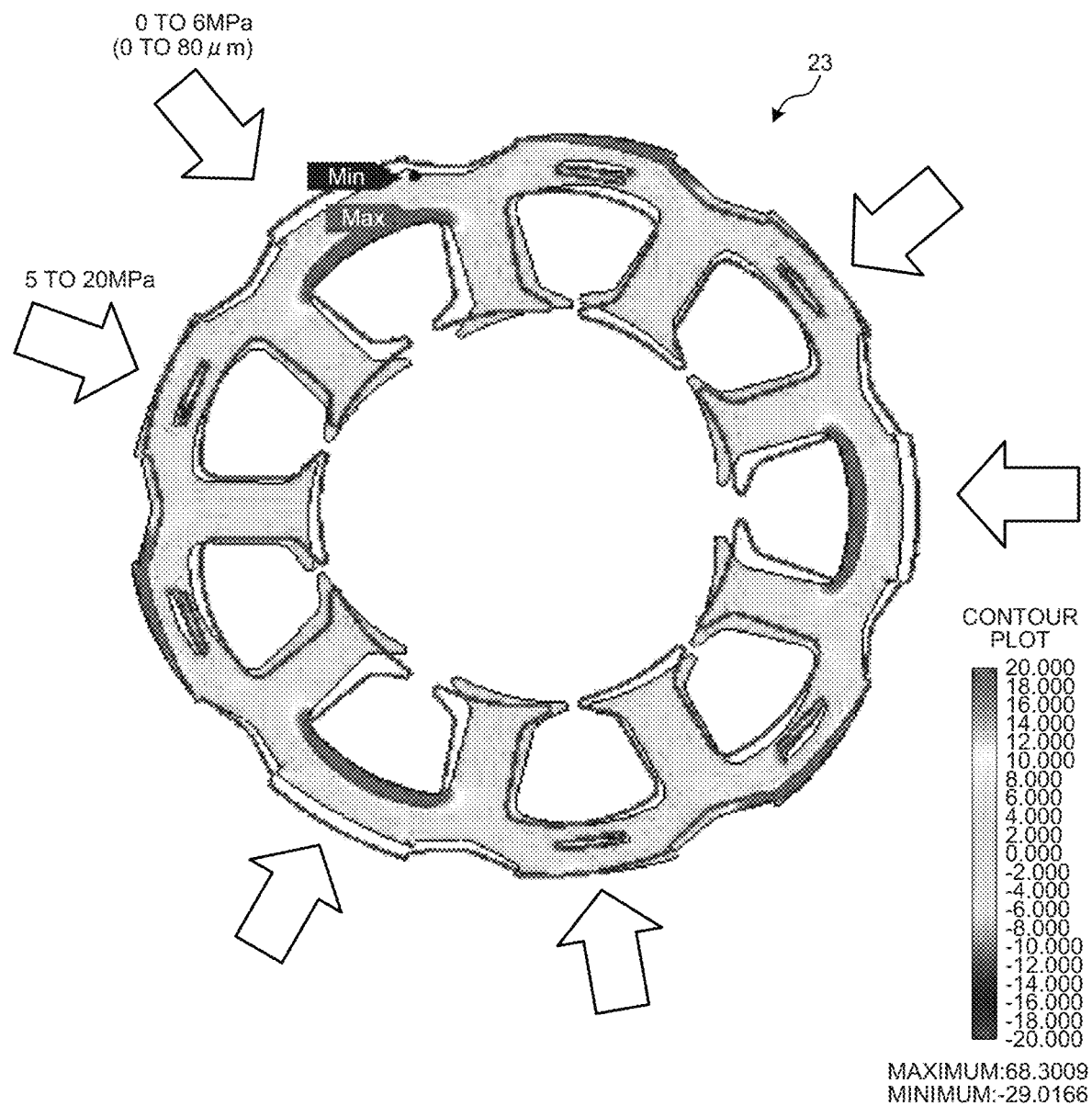
FIG. 10 is a diagram illustrating correction of the deformation of the stator core in the embodiment.

External Force and Stress Which Act on Stator Core in Manufacturing Processes of Compressor External force and stress on the stator core 23 configured in the above described manner will be described. FIG. 8 is a plan view for describing the external force and the stress which act on the stator core 23 in the manufacturing processes of the compressor 1 of the embodiment. FIG. 9 is a diagram illustrating, by analysis results of numerical analysis, the deformation, which is generated in the stator core 23 when the container 2 is shrink-fitted (temporarily joined) onto the stator core 23 in the manufacturing process of the compressor 1 of the embodiment. FIG. 10 is a diagram illustrating, by analysis results of numerical analysis, that the deformation of the stator core 23 generated by the shrink-fitting (temporary joining) in the manufacturing process of the compressor 1 of the embodiment is corrected (cancelled out) by welding after the temporary joining. In FIG. 10, analysis has been carried out on the assumption of a state in which three small-diameter parts 38 among the six small-diameter parts 38 are welded with the container 2.

FIG. 8 is schematically illustrating the external force and the stress applied to the stator core 23 in the processes of the manufacturing processes of the compressor 1 of the embodiment. In the order of arrows, respectively, FIG. 8 illustrates the stator core 23 before the shrink-fitting, the stator core 23 temporarily joined with the container 2 by the large-diameter parts 37 at the three locations by the shrink-fitting, and the stator core 23 welded with the container 2 by the small-diameter parts 38 at the six locations after the temporary joining by the shrink-fitting.

FIG. 9 illustrates analysis results of the deformation amount of the stator core 23 before and after the large-diameter parts 37 at the three locations are shrink-fitted onto the container 2 by the shrink-fitting illustrated in the first diagram and the second diagram of FIG. 8 in the manufacturing processes of the compressor 1 of the embodiment. In FIG. 9, the analysis is carried out on the assumption that the external force by the shrink-fitting applied to each of the large-diameter parts 37 at the three locations, is about 6 MPa. In FIG. 9, the line only with a contour illustrates the contour of the stator core 23 before the shrink-fitting, and the line with shading at the inside thereof illustrates the contour of the stator core 23 after the shrink-fitting. Note that in order to facilitate understanding of the manner of deformation, the deformation of the stator core 23 is illustrated in an exaggerated manner in FIG. 9. Also, the location with thick shading represents the location with a large deformation amount before and after the shrink-fitting, and the location with pale shading represents the location with a small deformation amount before and after the shrink-fitting.

FIG. 10 illustrates the analysis results of the deformation amount of the stator core 23 before the temporary joining by the shrink-fitting is carried out and after the small-diameter parts 38 at the six locations are welded onto the container 2 by the welding after the shrink-fitting illustrated in the first diagram and the third diagram of FIG. 8 in the manufacturing processes of the compressor 1 of the embodiment. In FIG. 10, the analysis has been carried out on the assumption that the external force caused by the shrink-fitting and applied to each of the large-diameter parts 37 at the three locations, is about 6 Mpa, and on the assumption that the external force caused by the welding and applied to each of the small-diameter parts 38 at the six locations, is 5 to 20 MPa. In FIG. 10, the line only with a contour illustrates the contour of the stator core 23 illustrated in the first diagram of FIG. 8 before the shrink-fitting, and the line with shading at the inside thereof illustrates the contour of the stator core 23 illustrated in the third diagram of FIG. 8 after the shrink-fitting and the welding is carried out. Similar to FIG. 9, in order to facilitate understanding of the manner of deformation, the deformation of the stator core 23 is illustrated in an exaggerated manner in FIG. 10. Also, the location with thick shading represents the location with a large deformation amount before and after the shrink-fitting and the welding is carried out, and the location with pale shading represents the location with a small deformation amount before and after the shrink-fitting and the welding is carried out.

As illustrated in FIG. 8 and FIG. 9, in the manufacturing processes of the compressor 1, the container 2 is shrink-fitted onto the stator core 23 in a state that the outer peripheral surfaces of the large-diameter parts 37 of the stator core 23 are fitted onto the inner peripheral surface of the container 2 by transition-fitting and that the outer peripheral surfaces of the small-diameter parts 38 are fitted onto the inner peripheral surface of the container 2 by clearance-fitting. As a result, the container 2 and the stator core 23 are temporarily joined by the large-diameter parts 37.

In a case of the three-phase motor 6 with nine slots, when a conventional stator core is temporarily joined in the container 2, nine locations in the circumferential direction of the stator core contact the interior of the container 2 (nine-face fitting). Compared with this structure, in the embodiment, only the three large-diameter parts 37 at the three locations in the circumferential direction of the stator core 23, contact the interior of the container 2 (three-face fitting). Therefore, in the embodiment, the locations by which the stator core 23 receives external force from the container 2, which is shrink-fitted on the stator core 23, can be decreased from the nine locations to the three locations. Therefore, in the embodiment, the external force applied from the container 2 to the stator core 23, is decreased.

Also, even in a case in which interference is generated with respect to the container 2 (R1>R3) when the large-diameter parts 37, which are transition-fitted onto the container 2, have a lower limit of dimension tolerance due to dimensional variations of the stator core 23, the locations by which the stator core 23 receives the external force from the welded parts 20, can be decreased, since only the three large-diameter parts 37 contact the interior of the container 2.

When the container 2 is shrink-fitted onto the stator core 23 in the above described manner, as illustrated in FIG. 8 and FIG. 9, the stator core 23 receives, by the three large-diameter parts 37 contacting the inner peripheral surface of the container 2, the external force toward the center O of the stator core 23 from the container 2 (see solid-line arrows in the center diagram of FIG. 8) in the plane orthogonal to the central axis of the stator core 23. Also, as the three large-diameter part 37 receive the external force toward the center O, in the interior of the stator core 23, stress (compression stress) toward the outer peripheral side is generated, as resistance force against the external force from the welded part 20, in the center part between the large-diameter parts 37 which are adjacent to each other in the circumferential direction of the stator core 23 (see broken-line arrows in the center diagram of FIG. 8). Therefore, as understood from the differences between the lines only with contours and the lines with shading at the inside thereof in FIG. 9, because of the shrink-fitting, the stator core 23 is deformed into a triangular shape, in which vicinities of the three large-diameter parts 37 are crushed toward the inner diameter side and vicinities of the six small-diameter parts 38 are pushed outward toward the outer diameter side.

Subsequently, as illustrated in FIG. 8 and FIG. 10, the welded parts 20 are formed since the small-diameter parts 38 of the stator core 23 are spot-welded with the container 2, after the stator core 23 is shrink-fitted in the container 2. When the small-diameter parts 38 and the container 2 are joined by the welded parts 20, as illustrated in FIG. 8, the six small-diameter parts 38 receive external force from the welded parts 20 in the direction toward the center O of the stator core 23. At the same time, as the small-diameter parts 38 receive the external force toward the center O, stress (compression stress) toward the outer peripheral side of the stator core 23 is generated in the large-diameter parts 37 as the resistance force against the external force. Since the external force and the stress like this act on the small-diameter parts 38 and the large-diameter parts 37, the deformation of the triangular shape generated in the stator core 23 along with the shrink-fitting of the container 2, is corrected to a circular shape on the plane orthogonal to the central axis of the stator core 23. By virtue of this, the shape of the stator core 23 in the inner peripheral side can be maintained in a circular shape along the outer peripheral surface of the rotor 21, and inequality of air gaps between the stator core 23 and the rotor 21, can be decreased. Therefore, magnetic balance can be equalized in the circumferential direction of the stator core 23, deterioration of vibrations can be prevented, and noise can be suppressed. Also, since the shape of the stator core 23 in the inner peripheral side is maintained in the circular shape, insertion of the rotor 21 in the inner peripheral side of the stator core 23 can be facilitated, and deterioration in the assemblability of the three-phase motor 6 due to dimensional variations, can be prevented.

Herein, a condition for generation of an interference S between the large-diameter part 37 of the stator core 23 and the container 2, is that the large-diameter-part outer diameter R1 of the large-diameter part 37 of the stator core 23 and the housing inner diameter R3 of the container 2 satisfy the relation of R1>R3 at the point before the shrink-fitting, and the interference S herein can be expressed by S=R1−R3. Therefore, when the interference S is generated, R1>R3 is satisfied according to S=R1−R3>0. On the other hand, a condition for generating the gap G between the small-diameter part 38 of the stator core 23 and the container 2, is that the small-diameter-part outer diameter R2 of the small-diameter part 38 of the stator core 23 and the housing inner diameter R3 of the container 2 satisfy the relation of R3>R2 at the point before the shrink-fitting, and the gap G herein is expressed by G=R3−R2. Therefore, when the gap G is generated, R3>R2 is satisfied according to G=R3−R2>0. With these two conditions together, when R2<R3<R1 is satisfied at the point before the shrink-fitting, the deformation generated due to the shrink-fitting can be mitigated by the welding.

When the small-diameter parts 38 of the deformed stator core 23 are welded with the container 2, the external force toward the center O of the stator core 23 acts on the small-diameter parts 38 as described above. Therefore, load (referred to as welding load.) is applied to the welded parts 20 of the stator core 23. Depending on the welding load applied to the welded parts 20, the inner diameter of the teeth parts 32 of the stator core 23 from the center O, is changed.

Correction of Deformation of Stator Core by Welding of Small-Diameter Parts

Figure 11:
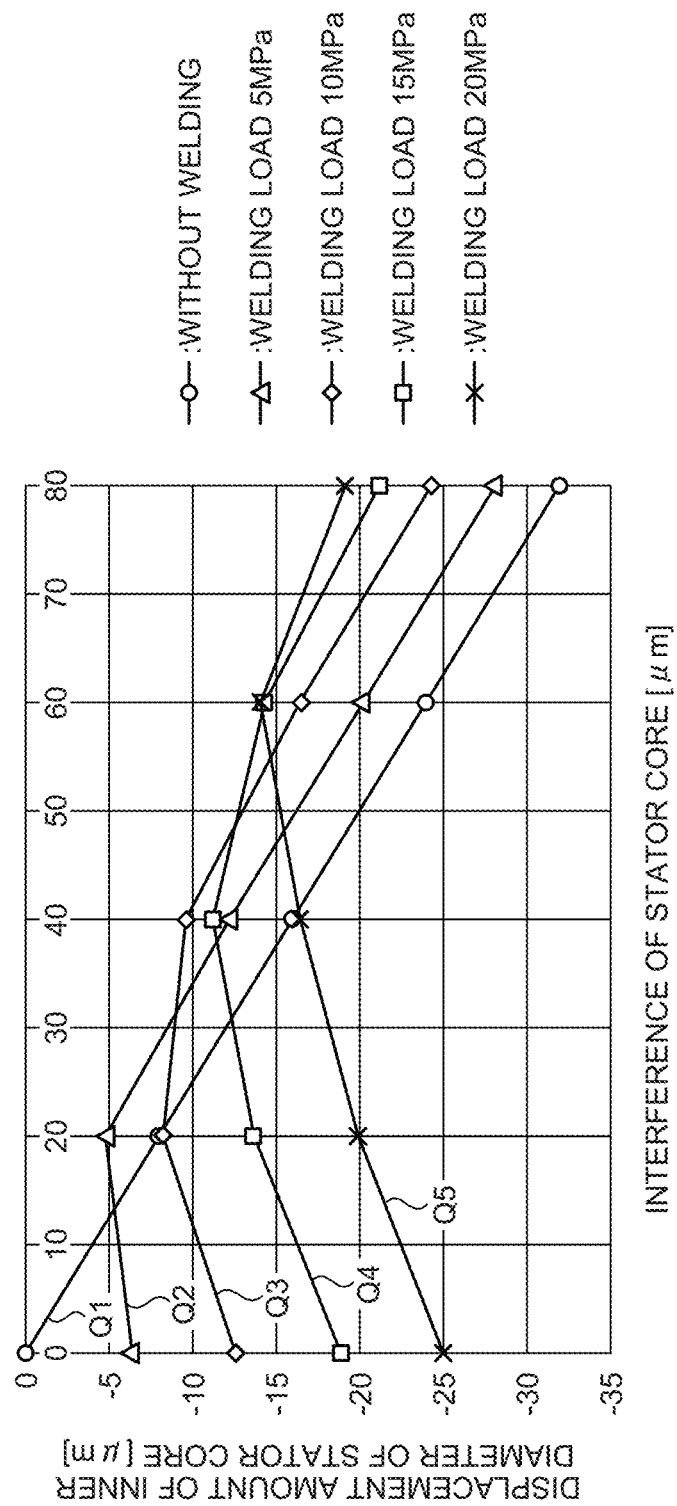
FIG. 11 is a graph illustrating that deformation of the stator core in the embodiment is corrected by welding.

FIG. 11 is a graph illustrating that the deformation generated in the stator core 23 along with the shrink-fitting of the container 2 in the above described manner, is corrected by welding the small-diameter parts 38 with the container 2. FIG. 11 illustrates the deformation amounts of the locations, at which the teeth parts 32 of the stator core 23 have been deformed the most by the shrink-fitting or welding, in the case, in which the interference S (the difference between the large-diameter-part outer diameter R1 of the large-diameter part 37 of the stator core 23 and the housing inner diameter R3 of the container 2: R1−R3) of the stator core 23 is equal to or higher than 0 in transition-fitting. In FIG. 11, the horizontal axis illustrates the interference S [μm] of the stator core 23, and the vertical axis illustrates maximum displacement amounts [μm] of the inner diameters of the teeth parts 32 of the stator core 23.

In FIG. 11, Q1 represents the maximum deformation amounts generated in the teeth parts 32 of the stator core 23 when the container 2 is shrink-fitted by the large-diameter parts 37 at the three locations of the stator core 23 in the manufacturing processes of the compressor 1 of the embodiment. As illustrated by Q1 in FIG. 11, it can be understood that, in the case only with the shrink-fitting by the three large-diameter parts 37 of the stator core 23 (at the point before the welding of the six small-diameter parts 38), the larger the interference S of the stator core 23, the larger the deformation of the teeth parts 32 of the stator core 23.

In FIGS. 11, Q2 to Q5 represent the maximum deformation amounts generated in the teeth parts 32 of the stator core 23 when the stator core 23 after the shrink-fitting by the large-diameter parts 37 at the three locations are further welded by the small-diameter parts 38 at the six locations of the stator core 23 in the manufacturing processes of the compressor 1 of the embodiment. In each of Q2 to Q5, analysis has been carried out on the assumption that the external force expected to be applied to the stator core 23 from each of the welded parts 20 at the six locations upon welding is 5 to 20 MPa at an interval of 5 MPa. Herein, the inner diameter of the stator core 23 means an inner diameter R4 of the teeth part 32 (see FIGS. 4 and 5).

First, focusing on Q2 of FIG. 11 (welding load: 5 MPa), when the interference of the stator core 23 is 0 μm, the displacement amount of the inner diameter R4 of the stator core 23 is about 6 μm, and the displacement amount is larger than 0 μm of the case of Q1 only with the shrink-fitting (without welding). In other words, when the interference is 0 μm, the stator core 23 is largely deformed by the welding more than before the welding. On the other hand, the displacement amount of the stator core 23 is about 5 μm when the interference of the stator core 23 of Q2 is 20 μm, and the displacement amount is smaller than the displacement amount 8 μm of the stator core 23 in the case in which the interference of Q1 is 20 μm. In other words, when the welding load is 5 MPa and the interference is 20 μm, the deformation of the stator core 23 can be mitigated by the welding more than before the welding. Similarly, in the range in which the interference of the stator core 23 is 40 μm or higher, when the cases of the same interference are mutually compared, the displacement amount of the inner diameter R4 of the stator core 23 (deformation amount of the stator core 23) is mitigated after the welding more than before the welding. Therefore, it can be said that, in the case in which the welding load is 5 MPa, the deformation of the stator core 23 is mitigated after the welding more than before the welding in the range in which the interference is equal to or higher than 20 μm (larger than 10 μm).

Similarly, focusing on Q3 of FIG. 11 (welding load: 10 MPa), when the interference of the stator core 23 is 0 μm, the displacement amount of the inner diameter R4 of the stator core 23 is about 13 μm, and the displacement amount is larger than 0 μm of the case of Q1 only with the shrink-fitting (without welding). In other words, also in Q3, when the interference is 0 μm, the stator core 23 is largely deformed by the welding more than before the welding. On the other hand, when the interference of the stator core 23 is 20 μm, the displacement amount of the inner diameter R4 of the stator core 23 of Q3 is about 8 μm, and the deformation amount of the stator core 23 is not changed compared with the case of Q1 before the welding. On the other hand, when the interference of the stator core 23 is 40 μm, the displacement amount of the stator core 23 of Q3 is about 9 μm, and the displacement amount is smaller than the displacement amount 16 μm of the stator core 23 in the case in which the interference of Q1 is 40 μm. In other words, when the welding load is 10 MPa and the interference is 40 μm, the deformation of the stator core 23 can be mitigated by the welding more than before the welding. Similarly, in the range in which the interference of the stator core 23 is 60 μm or higher, when the cases of the same interference are mutually compared, the displacement amount of the inner diameter R4 of the stator core 23 (deformation amount of the stator core 23) is mitigated after the welding more than before the welding. Therefore, it can be said that, in the case in which the welding load is 10 MPa, the deformation of the stator core 23 is mitigated after the welding more than before the welding in the range in which the interference is larger than 20 μm.

Similarly, it can be said that, according to Q4 (welding load: 15 MPa) of FIG. 11, in the case in which the welding load is 15 MPa, the deformation of the stator core 23 is mitigated after the welding more than before the welding in the range in which the interference is equal to or higher than 40 μm (larger than 30 μm). Similarly, it can be said that, according to Q5 (welding load: 20 MPa) of FIG. 11, in the case in which the welding load is 20 MPa, the deformation of the stator core 23 is mitigated after the welding more than before the welding in the range in which the interference is larger than 40 μm.

In other words, as illustrated in FIG. 11, at the point before the welding which is illustrated by Q1, the larger the interference of the stator core 23 (the larger the external force received by the stator core 23 from the container 2) in the case in which the shrink-fitting is carried out, the larger the displacement amount of the inner diameter R4 of the stator core 23. On the other hand, at the points after the welding illustrated by Q2 to Q5, when the line of Q1 before the welding is used as a reference, in the combinations of the interference and the welding load which are positioned below Q1, the displacement amount of the inner diameter R4 of the stator core 23 is increased (in other words, the stator core 23 is largely deformed by the welding more than before the welding). However, in the combinations of the interference and the welding load of Q2 to Q5 which are positioned above the line of Q1, which is before the welding, the displacement amount of the inner diameter R4 of the stator core 23 is low and suppressed after the welding more than the point before the welding (in other words, deformation of the stator core 23 is suppressed by carrying out the welding more than before the welding). Herein, according to FIG. 11, it can be understood that the deformation is mitigated after the welding within the range that satisfies S/Q>20/10=2 [μm/MPa], wherein the welding load is Q (MPa), and the interference in the shrink-fitting is S (μm).

As described above, the deformation generated in the stator core 23 by the shrink-fitting, is corrected by the welded parts 20 by which the small-diameter parts 38 are joined with the container 2. Also in the case in which the interference of the stator core 23 increases, increase in the displacement amount of the stator core 23 is suppressed by the welded parts 20. Therefore, the welded parts 20 by which the small-diameter parts 38 are joined with the container 2, can suppress the deformation of the stator core 23 and mitigate the distortion of the air gaps between the stator core 23 and the rotor 21.

Comparison between Embodiment and Comparative Example

Figure 12:
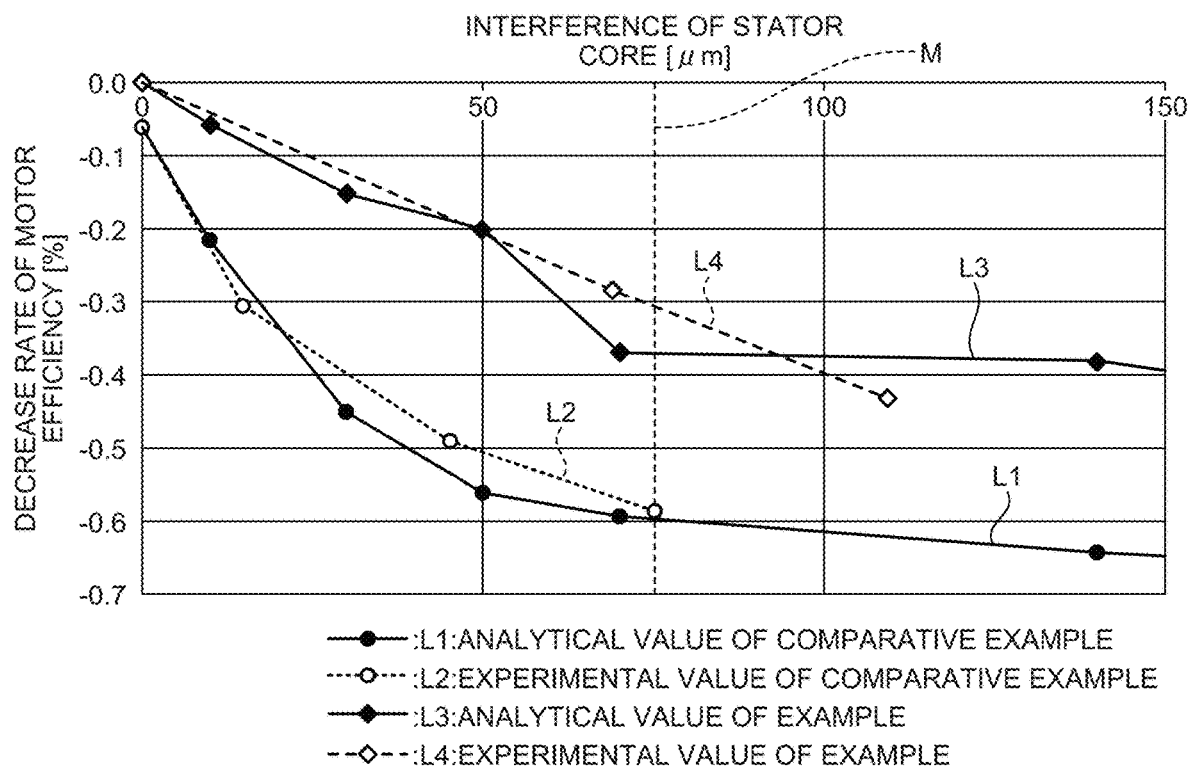
FIG. 12 is a graph illustrating relations between interferences of the stator core in the embodiment and a comparative example and decrease rates of motor efficiency.

FIG. 12 is a graph illustrating the relation between the interference of the stator core 23 in the embodiment and the comparative example and decrease rates of motor efficiency (the ratio of mechanical energy output from the three-phase motor 6 with respect to the electric energy input to the three-phase motor 6). In FIG. 12, the vertical axis illustrates the decrease rate [%] of the motor efficiency, and the horizontal axis illustrates the interference [μm] of the stator core 23. The comparative example has a nine-face fitting structure in which nine locations on the outer peripheral surface of the stator core 23 contact the inner peripheral surface of the container 2, and the decrease rates of the motor efficiency of the comparative example are illustrated by a solid line L1 and a broken line L2 in FIG. 12. The embodiment has the three-face fitting structure in which the outer peripheral surface of the three large-diameter parts 37 of the stator core 23 contact the inner peripheral surface of the container 2, and the decrease rates of the motor efficiency of the embodiment are illustrated by a solid line L3 and a broken line L4 in FIG. 12. In FIG. 12, the solid lines L1 and L3 are analytical values, and the broken lines L2 and L4 are actually measured values. Also, a broken line M is a maximum interference which is a lower limit of fitting tolerance and is, for example, set to about 60 to 80 [μm].

As illustrated in FIG. 12, the motor efficiency is lowered as the interference of the stator core increases in both of the embodiment and the comparative example. However, the decrease rates of the motor efficiency in the embodiment illustrated by the solid line L3 and the broken line L4 are smaller than the decrease rates of the motor efficiency in the comparative example illustrated by the solid line L1 and the broken line L2. In other words, according to the three-face fitting of the embodiment, decrease in the motor efficiency can be suppressed more than the nine-face fitting structure of the comparative example.

Figure 13:
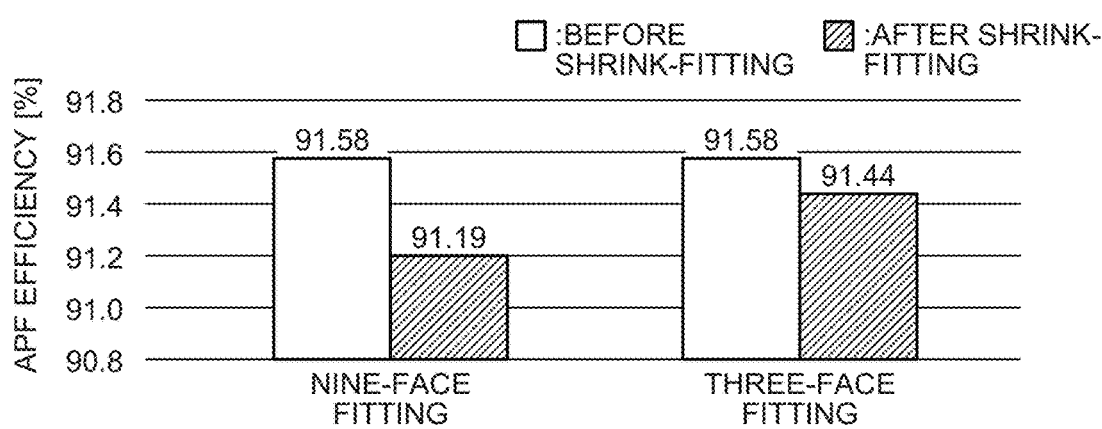
FIG. 13 is a graph for describing APF efficiency in the embodiment.

FIG. 13 is a graph for describing APF efficiency (annual performance factor) in the embodiment. FIG. 13 illustrates changes in the APF efficiency before the shrink-fitting and after the shrink-fitting of the container 2 with respect to the stator core regarding an embodiment and a comparative example. Similar to the above description, the comparative example has the nine-face fitting structure. The embodiment has the three-face fitting structure.

As illustrated in FIG. 13, in the comparative example, the APF efficiency is 91.58% before the shrink-fitting of the container 2. However, the APF efficiency is lowered to 91.19 [%] after the shrink-fitting of the container 2. On the other hand, in the embodiment, the APF efficiency is 91.58% before the shrink-fitting of the container 2. However, the APF efficiency is 91.44 [%] after the shrink-fitting of the container 2. Thus, in the embodiment, decrease in the APF efficiency before and after the shrink-fitting, is suppressed more than the comparative example. This is conceivably for a reason that, in the embodiment provided with the large-diameter parts 37 on three faces and the small-diameter parts 38 on six faces, external force is no longer applied on the small-diameter parts 38, and distortion of the stator core 23 is suppressed while, in the comparative example provided with the large-diameter parts on nine faces, external force is applied to all of the large-diameter parts.

Effects of Embodiment

As described above, in the three-phase motor 6 of the compressor 1 of the embodiment, in the stator core 23 of the stator 22, the plurality of large-diameter parts 37, which contact the inner peripheral surface of the container 2 when fitted by the shrink-fitting, and the plurality of small-diameter parts 38, which has the distance from the center O to the outer peripheral surface smaller than the distance of the large-diameter part 37, are formed so that the first recessed part 35 or the second recessed part 36 is interposed therebetween in the circumferential direction of the stator core 23. The container 2 and the stator core 23 are provided with the plurality of welded parts 20 by which the inner peripheral surface of the container 2 and the outer peripheral surface of the stator core 23 are joined, and the welded parts 20 are provided only in the small-diameter parts 38 in the stator core 23. Moreover, the small-diameter parts 38 do not contact the inner peripheral surface of the container 2 except for the welded parts 20 since the small-diameter parts are clearance-fitted on the inner peripheral surface of the container 2. By virtue of this, assemblability of the compressor 1 can be ensured sincebe temporarily joined on the inner peripheral surface of the container 2 when the large-diameter parts 37 are fitted by shrink-fitting on the inner peripheral surface of the container 2. Moreover, since the small-diameter parts 38 are clearance-fitted on the inner peripheral surface of the container 2, the area by which the outer peripheral surface of the stator core 23 contacts the inner peripheral surface of the container 2 in the circumferential direction of the stator core 23 can be decreased. Therefore, compression distortion generated in the stator core 23 can be decreased. Moreover, since the welded parts 20 by which the small-diameter parts 38 are joined with the container 2 are provided, the deformation generated in the stator core 23 upon the shrink-fitting can be corrected while firmly fixing the stator core 23 to the container 2, and the air gaps between the stator core 23 and the rotor 21 can be uniformized in the circumferential direction. Therefore, according to the embodiment, decrease in the efficiency of the three-phase motor 6 can be suppressed by decreasing the distortion of the stator core 23 while ensuring the assemblability of the compressor 1. Moreover, as illustrated in FIG. 11, since the small-diameter parts 38 are welded, displacement of the inner diameter R4 of the stator core 23 (deformation of the stator core 23) after the shrink-fitting can be mitigated more than the point before the welding is carried out. Furthermore, as illustrated in FIG. 12, the decrease in the motor efficiency caused along with the size of the interference of the shrink-fitting, can be suppressed. Moreover, as illustrated in FIG. 13, since the temporary joining is carried out with the large-diameter parts 37 of the three faces with respect to the container 2, the decrease in the APF efficiency before and after the shrink-fitting can be suppressed more than the case in which temporary joining is carried out with all the nine faces with respect to the container 2.

Moreover, in the compressor 1 of the embodiment, in the circumferential direction of the stator core 23, a small-diameter range, which is a sum of the circumferential-direction lengths W2 of the plurality of small-diameter parts 38 along the outer peripheral surface of the stator core 23, is larger than a large-diameter range, which is a sum of the circumferential-direction length W1 of the plurality of large-diameter parts 37. By virtue of this, in the circumferential direction of the stator core 23, the large-diameter range by which the outer peripheral surface of the stator core 23 contacts the inner peripheral surface of the container 2 is decreased, and the external force and stress applied to the stator core 23 can be decreased.

Moreover, in the compressor 1 of the embodiment, each of the plurality of small-diameter parts 38 of the stator core 23 is provided with the through-hole 29, which penetrates through the stator core 23 along the axial direction of the shaft 3. By virtue of this, the through-holes 29 act as heat insulating spaces, which insulate the heat applied to the stator core 23 upon the welding of the small-diameter parts 38 and the container 2. Therefore, the insulative film 26 of the slots can be prevented from being melted by the heat in the welding.

Moreover, in the compressor 1 of the embodiment, the through-hole 29 of the small-diameter part 38 of the stator core 23 is formed to extend in the circumferential direction of the stator core 23, and the length of the through-hole 29 in the circumferential direction of the stator core 23 is formed to be larger than the length of the welded part 20 in the circumferential direction of the stator core 23. By virtue of this, heat is caused to escape along the circumferential direction of the stator core 23 while the heat transmitted from the welded part 20 is shielded by the through-hole 29. Therefore, transmission of the heat toward the inner diameter side of the stator core 23 around the through-hole 29, can be suppressed. Therefore, melting of the insulative film 26 due to the heat in the welding, can be further prevented.

Note that the compressor 1 of the present embodiment is not limited to a rotary compressor, but may be applied to another compressor such as a scroll compressor.

REFERENCE SIGNS LIST

1 COMPRESSOR
2 CONTAINER (COMPRESSOR HOUSING)
3 SHAFT (ROTARY SHAFT)
5 COMPRESSION PART
6 THREE-PHASE MOTOR
8a REFRIGERANT OIL (LUBRICATING OIL)
11 INTAKE TUBE (INTAKE PART)
12 DISCHARGE TUBE (DISCHARGE PART)
20 WELDED PART
21 ROTOR
22 STATOR
23 STATOR CORE
29 THROUGH-HOLE
35 FIRST RECESSED PART (RECESSED PART)
36 SECOND RECESSED PART (RECESSED PART)
37 LARGE-DIAMETER PART
38 SMALL-DIAMETER PART
G GAP
O ROTATION CENTER (CENTER)
R1 LARGE-DIAMETER-PART OUTER DIAMETER
R2 SMALL-DIAMETER-PART OUTER DIAMETER
R3 HOUSING INNER DIAMETER
R4 INNER DIAMETER OF STATOR CORE
S INTERFERENCE
W1, W2 CIRCUMFERENTIAL-DIRECTION LENGTH

The invention claimed is:

1. A compressor comprising: a compressor housing; a compression part that is disposed in the compressor housing and compresses a cooling medium; and a motor that is disposed in the compressor housing and drives the compression part, wherein
the motor has a rotor provided coaxially with respect to a rotary shaft of the compression part, and a stator core disposed on an outer peripheral side of the rotor,
the stator core has formed thereon, in a circumferential direction, a plurality of large-diameter parts shrink-fitted on an inner peripheral surface of the compressor housing, a plurality of small-diameter parts each having a distance from a rotation center of the motor to an outer peripheral surface of the stator core that is smaller than the distance of the large-diameter part, and a plurality of recessed parts, which is formed at an interval in a circumferential direction of the outer peripheral surface of the stator core and through which lubricating oil in the compressor housing passes along the outer peripheral surface,
the small-diameter part and the large-diameter part adjacent to each other in the circumferential direction of the stator core are formed to interpose the recessed part between the small-diameter part and the large-diameter part, and
the stator core is provided with a plurality of welded parts joining the inner peripheral surface of the compressor housing with the outer peripheral surface of the stator core, and the welded parts are provided in the small-diameter parts of the stator core.

2. The compressor according to claim 1, wherein,
in the circumferential direction of the stator core, a circumferential-direction length of the large-diameter part along the outer peripheral surface of the stator core and a circumferential-direction length of the small-diameter part are equal to each other.

3. The compressor according to claim 1, wherein,
in the circumferential direction of the stator core, a small-diameter range, which is a sum of the circumferential-direction lengths of the plurality of small-diameter parts along the outer peripheral surface of the stator core, is larger than a large-diameter range, which is a sum of the circumferential-direction lengths of the plurality of large-diameter parts.

4. The compressor according to claim 1, wherein,
in the stator core, a number of the small-diameter parts is two times or more a number of the large-diameter parts.

5. The compressor according to claim 1, wherein
each of the plurality of small-diameter parts is provided with a through-hole that penetrates through the stator core along an axial direction of the rotary shaft.

6. A compressor comprising: a compressor housing; a compression part that is disposed in the compressor housing and compresses a cooling medium; and a motor that is disposed in the compressor housing and drives the compression part, wherein the motor has a rotor provided coaxially with respect to a rotary shaft of the compression part, and a stator core disposed on an outer peripheral side of the rotor, the stator core has formed thereon, in a circumferential direction, a plurality of large-diameter parts in contact with an inner peripheral surface of the compressor housing and a plurality of small-diameter parts each having a distance from a rotation center of the motor to an outer peripheral surface that is smaller than the distance of the large-diameter part, the stator core is provided with a plurality of welded parts joining the inner peripheral surface of the compressor housing with the outer peripheral surface of the stator core, and the welded parts are provided in the small-diameter parts of the stator core, and before arranging the stator core in the compressor housing, $R2<R3<R1$ is satisfied, wherein R1 represents a large-diameter-part outer diameter that is a distance from the rotation center to the outer peripheral surface of the large-diameter part, R2 represents a small-diameter-part outer diameter that is a distance from the rotation center to the outer peripheral surface of the small-diameter part, and R3 represents a housing inner diameter that is a distance from the rotation center to the inner peripheral surface of the compressor housing, and the stator core is shrink-fitted onto the compressor housing by the large-diameter part and is welded with the compressor housing by the small-diameter part.

* * * * *